US012656196B2

(12) United States Patent
Hongo

(10) Patent No.: US 12,656,196 B2
(45) Date of Patent: Jun. 16, 2026

(54) OPTICAL FORCE SENSOR DEVICE WITH REFLECTIVE DISPLACEMENT MEASUREMENT

(71) Applicant: Sony Group Corporation, Tokyo (JP)

(72) Inventor: Kazuo Hongo, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 295 days.

(21) Appl. No.: 18/285,601

(22) PCT Filed: Jan. 18, 2022

(86) PCT No.: PCT/JP2022/001609
§ 371 (c)(1),
(2) Date: Oct. 4, 2023

(87) PCT Pub. No.: WO2022/249537
PCT Pub. Date: Dec. 1, 2022

(65) Prior Publication Data
US 2024/0183728 A1     Jun. 6, 2024

(30) Foreign Application Priority Data

May 24, 2021     (JP) ................................. 2021-086877

(51) Int. Cl.
*G01L 1/24*          (2006.01)
*G01B 11/02*       (2006.01)
(Continued)

(52) U.S. Cl.
CPC ............ *G01L 1/248* (2013.01); *G01B 11/026* (2013.01); *G01B 11/16* (2013.01); *G01C 3/08* (2013.01);
(Continued)

(58) Field of Classification Search
CPC ......... G01L 1/248; G01L 5/166; G01L 1/044; G01L 1/24; G01L 9/0077; G01B 11/16;
(Continued)

(56) References Cited

U.S. PATENT DOCUMENTS 7,180,663 B2 *   2/2007   Collender .............. G03B 25/00
                                                              348/E13.058
2015/0168239 A1 *   6/2015   Toussaint ............... G02B 21/04
                                                              359/368

(Continued)

FOREIGN PATENT DOCUMENTS

JP          2010-112814 A       5/2010
JP          2017161404 A   *   9/2017
(Continued)

OTHER PUBLICATIONS

Translation WO_2014045685 (Year: 2013).*
Translation JP_2017161404 (Year: 2017).*

*Primary Examiner* — Peter J Macchiarolo
*Assistant Examiner* — Monica S Young
(74) *Attorney, Agent, or Firm* — Paratus Law Group, PLLC

(57)          ABSTRACT

There is provided a sensor device to detect a force sense with a smaller and simpler mechanism. The sensor device includes: a force acting portion exposed from an opening provided on an exterior portion and attached to an inside of the exterior portion via a flexible body; a reflection space of which at least two surfaces are surrounded by a first mirror provided on an inner bottom surface of the exterior portion and a second mirror provided on a surface of the force acting portion or flexible body, the surface facing the first mirror; and a light source unit configured to emit light to the reflection space; and an imaging unit provided on the inner bottom surface of the exterior portion and configured to (Continued)

capture an image including a force sense detection region in which reflection light of the light emitted from the light source unit is seen.

20 Claims, 27 Drawing Sheets

(51) Int. Cl.

| | |
|---|---|
| *G01B 11/16* | (2006.01) |
| *G01C 3/08* | (2006.01) |
| *G01L 1/04* | (2006.01) |
| *G01L 5/166* | (2020.01) |
| *G02B 17/00* | (2006.01) |

(52) U.S. Cl.
CPC ............ *G01L 1/044* (2013.01); *G02B 17/004* (2013.01); *G01L 5/166* (2013.01)

(58) Field of Classification Search
CPC ..... G01B 11/026; B25J 19/021; B25J 13/082; G02B 17/004; G01C 3/08

USPC .......................................................... 73/800
See application file for complete search history.

(56) References Cited

U.S. PATENT DOCUMENTS

| | | | | |
|---|---|---|---|---|
| 2015/0276518 A1* | 10/2015 | Nagura | ................ | G01B 11/161 |
| | | | | 250/227.19 |
| 2017/0363464 A1* | 12/2017 | Shafer | ...................... | G01D 5/30 |
| 2020/0049579 A1 | 2/2020 | Noh et al. | | |
| 2023/0296460 A1* | 9/2023 | Groche | .................. | G01L 5/166 |

FOREIGN PATENT DOCUMENTS

| | | | | |
|---|---|---|---|---|
| JP | 2020-043497 A | 3/2020 | | |
| WO | WO-2014045685 A1 * | 3/2014 | ............ | G01L 5/221 |
| WO | WO 2020/115982 A1 | 6/2020 | | |
| WO | WO-2020166185 A1 * | 8/2020 | .............. | G01D 5/30 |
| WO | WO 2021/085186 A1 | 5/2021 | | |

* cited by examiner

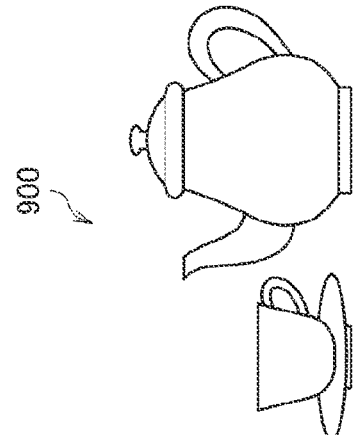
*FIG. 4*
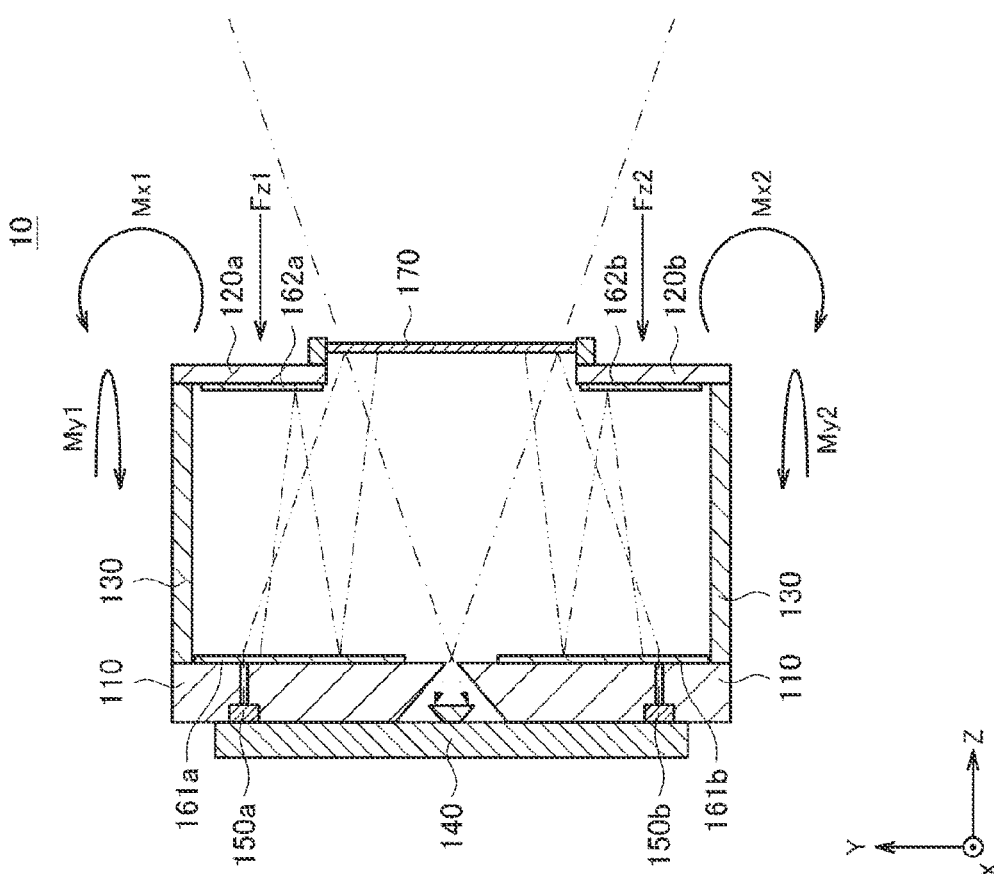

OPTICAL FORCE SENSOR DEVICE WITH REFLECTIVE DISPLACEMENT MEASUREMENT

CROSS REFERENCE TO PRIOR APPLICATION

This application is a National Stage Patent Application of PCT International Patent Application No. PCT/JP2022/001609 (filed on Jan. 18, 2022) under 35 U.S.C. § 371, which claims priority to Japanese Patent Application No. 2021-086877 (filed on May 24, 2021), which are all hereby incorporated by reference in their entirety.

TECHNICAL FIELD

The present disclosure relates to a sensor device.

BACKGROUND ART

In recent years, a sensor fusion technology for extracting new information that cannot be obtained by a single sensor by integrating information acquired from a plurality of sensors has attracted attention. Therefore, it is required to effectively acquire more pieces of information from a plurality of sensors.

For example, application of the sensor fusion technology to control of a robot arm disclosed in Patent Document 1 below has been studied.

CITATION LIST

Patent Document

Patent Document 1: Japanese Patent Application Laid-Open No. 2020-43497

SUMMARY OF THE INVENTION

Problems to be Solved by the Invention

The robot arm disclosed in Patent Document 1 described above controls the operation of the robot arm by imaging an object present ahead of a robot hand with an image sensor. Moreover, the robot arm disclosed in patent Document 1 can grip the object with higher accuracy by detecting a force sense when the object is gripped by the robot hand with the force sensor. However, mounting the force sensor on the robot arm enlarges the entire system and increases the mass of the entire system.

Therefore, the present disclosure proposes a novel and improved sensor device capable of detecting a force sense with a smaller and simpler mechanism.

Solutions to Problems

According to an aspect of the present disclosure, there is provided a sensor device including: a force acting portion exposed from an opening provided on an exterior portion and attached to an inside of the exterior portion via a flexible body; a reflection space of which at least two surfaces are surrounded by a first mirror provided on an inner bottom surface of the exterior portion and a second mirror provided on a surface of the force acting portion or flexible body, the surface facing the first mirror; and a light source unit configured to emit light to the reflection space; and an imaging unit provided on the inner bottom surface of the exterior portion and configured to capture an image including a force sense detection region in which reflection light of the light emitted from the light source unit is seen.

BRIEF DESCRIPTION OF DRAWINGS

FIG. 4 is an explanatory diagram illustrating imaging by a sensor device and an external force acting on a sensor device.

MODE FOR CARRYING OUT THE INVENTION

Figure 1:
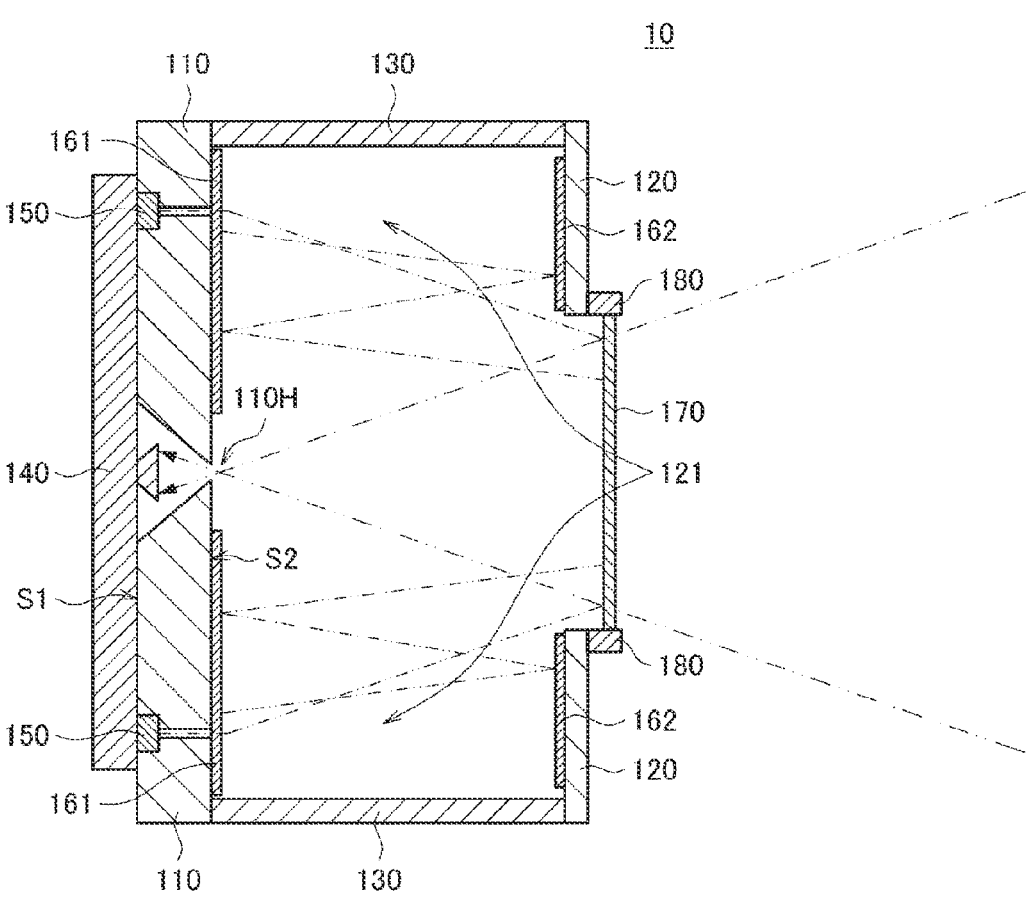
FIG. 1 is a cross-sectional view schematically illustrating a configuration of a sensor device according to a first embodiment of the present disclosure.

A preferred embodiment of the present disclosure will now be described in detail with reference to the accompanying drawings. It should be noted that, in the present specification and the drawings, constituent elements having substantially the same functional configuration are designated by the same reference numerals, and a redundant description will be omitted.

Note that, the description will be given in the following order.

1. First Embodiment (Sensor Device)
1.1. Configuration
1.2. Operation
1.3. Modification Example
2. Second Embodiment (Sensor Device)
3. Third Embodiment (Gripping Device)
3.1. Configuration
3.2. Function
4. Application Example 1. First Embodiment (Sensor Device)

1.1. Configuration

First, a configuration of a sensor device according to a first embodiment of the present disclosure will is described with reference to FIG. 1. FIG. 1 is a cross-sectional view schematically illustrating a configuration of a sensor device 10 according to the present embodiment.

As illustrated in FIG. 1, the sensor device 10 includes a base portion 110, a force acting portion 120, flexible bodies 130 and 180, an imaging unit 140, a light source unit 150, a first mirror 161, a second mirror 162, and a half mirror 170.

The base portion 110 is a flat and rigid structural member having a light intake hole 110H provided substantially at the center. The base portion 110 causes light (also referred to as external light) incident from the outside of the sensor device 10 via the light intake hole 110H provided at the center to be incident on the imaging unit 140 provided on a first surface S1 side of the base portion 110 (a side opposite to the incident side of the external light incident on the sensor device 10).

The force acting portion 120 is a rigid structural member provided on a second surface S2 side of the base portion 110 (an incident side of external light incident on the sensor device 10) via the flexible body 130. For example, the force acting portion 120 may be provided to be opposed to the second surface S2 of the base portion 110 around the light intake hole 110H.

The force acting portion 120 is a portion on which a force from the outside (also referred to as an external force) acts in the sensor device 10. In a case where an external force acts on the force acting portion 120, the flexible body 130 between the force acting portion 120 and the base portion 110 is deformed, and a positional relationship between the first mirror 161 and the second mirror 162 is changed. Thus, the position of each light point of the reflection light emitted from the light source unit 150 and multiple-reflected by the first mirror 161 and the second mirror 162 is displaced. Therefore, the sensor device 10 can detect the external force acting on the force acting portion 120 by measuring the displacement of the position of each light point of the reflection light multiple-reflected by the first mirror 161 and the second mirror 162.

A plurality of the force acting portions 120 may be provided. In such a case, the sensor device 10 can detect the external force acting on each of a plurality of locations by receiving the external force acting on each of the plurality of locations of the sensor device 10 through each force acting portion 120.

Specifically, a plurality of the force acting portions 120 may be disposed point-symmetrically or line-symmetrically with respect to the light intake hole 110H. For example, two force acting portions 120 may be provided in a 180-degree-arrangement (that is, by disposing the light intake hole 110H therebetween to be opposed to each other) with the light intake hole 110H disposed therebetween. Three force acting portions 120 may be provided in the 120-degree-arrangement with the light intake hole 110H disposed as the center, or four force acting portions 120 may be provided in a 90-degree-arrangement with the light intake hole 110H disposed as the center. Since a plurality of the force acting portions 120 is disposed point-symmetrically or line-symmetrically with respect to the light intake hole 110H, it is possible to isotropically detect the external force acting on the sensor device 10.

The half mirror 170 is provided on the incident side of the external light so as to cover the light intake hole 110H. Specifically, the half mirror 170 may be provided in a rectangular or circular flat plate shape and may be provided so as to be bridged between a plurality of the force acting portions 120 via the flexible body 180.

The half mirror 170 is an optical member that has a light transmittance of more than 20% and less than 908 and a light reflectance of more than 10% and less than 80%, partially transmits incident light, and partially reflects the incident light. For example, the half mirror 170 can be configured by forming an extremely thin film having light transmittance and light reflectance with a metal material such as chromium (Cr) on a transparent member including glass and a resin. Alternatively, the half mirror 170 can be configured by forming a dielectric multilayer film on a transparent member including glass and a resin so as to have light transmittance and light reflectance. The light transmittance and light reflectance of the half mirror 170 can be set to arbitrary values according to characteristics realized by the sensor device 10.

For example, the light-transmissive half mirror 170 can transmit external light incident on the sensor device 10 to the inside of the sensor device 10 provided with the light intake hole 110H. With this configuration, in the sensor device 10, the external space of the sensor device 10 can be imaged by the imaging unit 140 by using the external light entering through the light intake hole 110H. Furthermore, for example, the light-reflective half mirror 170 can reflect light emitted from the light source unit 150 in the similar manner to the first mirror 161 and the second mirror 162. With this configuration, the sensor device 10 can detect the position of each light point of the reflection light emitted from the light source unit 150 and multiple-reflected by the first mirror 161, the second mirror 162, and the half mirror 170 by using the imaging unit 140. Therefore, the sensor device 10 can simultaneously perform imaging of the external space of the sensor device 10 and detection of a light point group of the reflection light multiple-reflected by the first mirror 161, the second mirror 162, and the half mirror 170 by using the imaging unit 140.

The flexible bodies 130 and 180 are structural members that are deformed in proportion to the applied stress. For example, the flexible bodies 130 and 180 may be elastic bodies that are obviously easily deformed, such as rubber, elastomer, or a spring. Furthermore, the flexible bodies 130 and 180 may include the same material as other components, but may be a structural member formed to have low rigidity so as to be more easily deformed than other components. The flexible body 130 is provided between the base portion 110 and the force acting portion 120, and the flexible body 180 is provided between the half mirror 170 and the force acting portion 120. The flexible bodies 130 and 180 are deformed according to an external force acting on the force acting portion 120, and thus the positional relationship among the first mirror 161, the second mirror 162, and the half mirror 170 can be changed.

The first mirror 161 is provided on the second surface S2 of the base portion 110, and the second mirror 162 is provided on a surface of the force acting portion 120 opposed to the base portion 110. That is, the first mirror 161 and the second mirror 162 are provided on a surface on the internal space side of the sensor device 10 surrounded by the base portion 110 and the force acting portion 120. For example, the first mirror 161 and the second mirror 162 can be configured by forming a film of a metal material such as chromium (Cr) on a transparent member including glass and a resin so as to have the thickness with a sufficient light reflectance. The first mirror 161 and the second mirror 162, which face each other, can multiply reflect the light emitted from the light source unit 150 in a reflection space 121 between the first mirror 161 and the second mirror 162.

Figure 2:
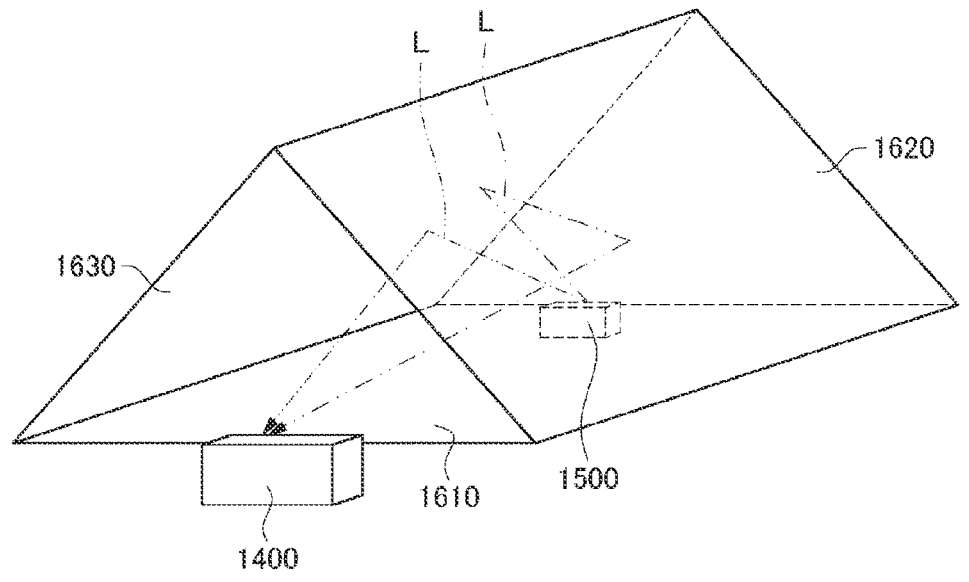
FIG. 2 is an explanatory view illustrating a state in which light is emitted to a space surrounded by three mirrors facing each other.
Figure 3:
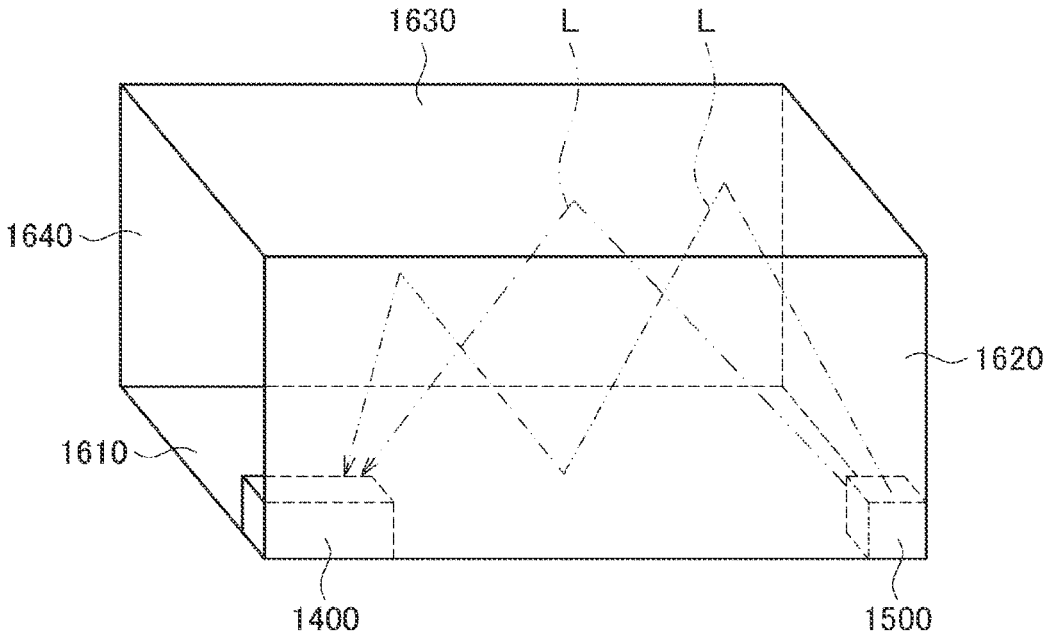
FIG. 3 is an explanatory view illustrating a state in which light is emitted to a space surrounded by four mirrors facing each other.

Here, multiple reflection by the first mirror 161 and the second mirror 162, which face each other, will be described with reference to FIG. 2 and FIG. 3. FIG. 2 is an explanatory view illustrating a state in which light is emitted to a space surrounded by three mirrors facing each other. FIG. 3 is an explanatory view illustrating a state in which light is emitted to a space surrounded by four mirrors facing each other.

As illustrated in FIG. 2, light L emitted from a light source unit 1500 is multiple-reflected by a first mirror 1610, a second mirror 1620, and a third mirror 1630, which are provided to face each other at positions respectively corresponding to side surfaces of a triangular column. In such a case, the light L emitted from the light source unit 1500 is received by a light reception unit 1400 after the number of light points of the reflection light is increased by multiple reflection of the first mirror 1610, the second mirror 1620, and the third mirror 1630. Furthermore, in a case where the first mirror 1610, the second mirror 1620, or the third mirror 1630 is displaced, the position of the light point of the reflection light of the light L emitted from the light source unit 1500 is displaced by increasing the displacement of the first mirror 1610, the second mirror 1620, or the third mirror 1630.

Note that the first mirror 1610, the second mirror 1620, and the third mirror 1630 may be disposed so as to respectively correspond to sides of an equilateral triangle or an isosceles triangle or may be disposed so as to respectively correspond to sides of a triangle formed by collapsing the equilateral triangle or the isosceles triangle. Since the first mirror 1610, the second mirror 1620, and the third mirror 1630 are disposed so as to respectively correspond to sides of a low symmetrical triangle (that is, a triangle obtained by collapsing the equilateral triangle or the isosceles triangle), it is possible to further increase the number of light points of reflection light due to multiple reflection.

In the sensor device 10, the first mirror 161 and the second mirror 162 can form a structure corresponding to side surfaces of the triangular column as illustrated in FIG. 2 with a third mirror (not illustrated). In such a case, the sensor device 10 can multiply reflect the light emitted from the light source unit 150 by using the inside of the triangular column of which the side surfaces are formed by the first mirror 161, the second mirror 162, and the third mirror as the reflection space 121.

Note that the first mirror 161 and the second mirror 162 may form a structure corresponding to side surfaces of a triangular pyramid with a third mirror (not illustrated). Even in such a case, the sensor device 10 can multiply reflect the light emitted from the light source unit 150 by using the inside of the triangular pyramid of which the side surfaces are formed by the first mirror 161, the second mirror 162, and the third mirror as the reflection space 121.

Furthermore, as illustrated in FIG. 3, light L emitted from a light source unit 1500 is multiple-reflected by a first mirror 1610, a second mirror 1620, a third mirror 1630, and a fourth mirror 1640, which are provided to face each other at positions respectively corresponding to side surfaces of a quadratic column. In such a case, the light L emitted from the light source unit 1500 is received by a light reception unit 1400 after the number of light points of the reflection light is increased by multiple reflection of the first mirror 1610, the second mirror 1620, the third mirror 1630, and the fourth mirror 1640. Furthermore, in a case where the first mirror 1610, the second mirror 1620, the third mirror 1630, the fourth mirror 1640 is displaced, the position of the light point of the reflection light of the light L emitted from the light source unit 1500 is displaced by increasing the displacement of the first mirror 1610, the second mirror 1620, the third mirror 1630, or the fourth mirror 1640.

In the sensor device 10, the first mirror 161 and the second mirror 162 can form a structure corresponding to side surfaces of the quadratic column as illustrated in FIG. 3 with a third mirror and a fourth mirror (not illustrated). In such a case, the sensor device 10 can multiply reflect the light emitted from the light source unit 150 by using the inside of the quadratic column of which the side surfaces are formed by the first mirror 161, the second mirror 162, the third mirror, and the fourth mirror as the reflection space 121.

Note that the first mirror 161 and the second mirror 162 may form a structure corresponding to side surfaces of a quadrangular pyramid with a third mirror and a fourth mirror (not illustrated). Even in such a case, the sensor device 10 can multiply reflect the light emitted from the light source unit 150 by using the inside of the quadrangular pyramid of which the side surfaces are formed by the first mirror 161, the second mirror 162, the third mirror, and the fourth mirror as the reflection space 121.

The light source unit 150 emits light to the second surface S2 side of the base portion 110. Specifically, the light source unit 150 emits light to the reflection space 121 of which at least two surfaces are surrounded by the first mirror 161 and the second mirror 162. The reflection space 121 is, for example, a space between the first mirror 161 and the second mirror 162, which face each other. The light source unit 150 can emit light to the reflection space 121 and multiply reflection of the emitted light is caused in the reflection space 121 between the first mirror 161 and the second mirror 162. The light source unit 150 may emit light from the bottom surface side (that is, the base portion 110 side) of the reflection space 121 to the reflection space 121, or may emit light from the side surface side (that is, the flexible body 130 side) of the reflection space 121 to the reflection space 121. The light source unit 150 may be, for example, a light emitting diode (LED) light source capable of emitting light having high straightness.

For example, the light source unit 150 may be provided on the base portion 110 side. In such a case, since the sensor device 10 can form a wiring to the light source unit 150 similarly to the wiring of the imaging unit 140, the cost and workload for forming the wiring can be reduced. Therefore, the sensor device 10 can further reduce the production cost.

Furthermore, the light source unit 150 may be provided inside the base portion 110 such that a main body portion such as the LED light source, a wiring, and the like are not exposed to the reflection space 121. In such a case, the sensor device 10 can prevent the images of the main body portion and wiring of the light source unit 150 from being multiple-reflected by the first mirror 161 and the second mirror 162. Therefore, since the sensor device 10 can prevent the multiple-reflected images of the main body portion and wiring of the light source unit 150 from being a noise factor, it is possible to prevent the detection sensitivity of the light point group of the reflection light multiple-reflected by the first mirror 161 and the second mirror 162 from deteriorating.

Moreover, the light source unit 150 may emit light to the reflection space 121 via a pinhole. The pinhole is, for example, a hole having a diameter of about several mm. The light source unit 150 emits the light to the reflection space 121 via the pinhole, and thus convergence of the emitted light can be further enhanced. With this configuration, in the light source unit 150, the shape of each light point of the reflection light multiple-reflected by the first mirror 161 and the second mirror 162 can be a smaller perfect circle, and thus the detection sensitivity of each light point can be improved. Furthermore, since the accuracy of the pinhole processing is generally higher than the positioning accuracy at the time of assembling the light source unit 150, the light source unit 150 emits light to the reflection space 121 via the pinhole. Thus, the accuracy of the position where the light is emitted can be further enhanced. Therefore, the sensor device 10 can more easily control the position of each light point of the reflection light multiple-reflected by the first mirror 161 and the second mirror 162.

Here, in a case where a plurality of the force acting portions 120 is provided, a plurality of the light source units 150 may be provided corresponding to each of the force acting portions 120. In such a case, the light source unit 150 may emit light of different colors for each corresponding force acting portion 120.

Furthermore, the light source unit 150 may emit light to another reflection space 121 of which two surfaces are surrounded by the second mirror 162 and the first mirror 161, which are provided on the corresponding force acting portions 120 such that the light point group of the reflection light is separated for each corresponding force acting portion 120. With this configuration, the sensor device 10 can detect the external force acting on each of the force acting portions 120 by the displacement of the light point group of the reflection light that can be separated from each other in color or position. Therefore, the sensor device 10 can detect the external force acting on each of the force acting portions 120 separately with high accuracy.

The imaging unit 140 is an image sensor that acquires a captured image by receiving light incident through the light intake hole 110H. The imaging unit 140 may be, for example, a CMOS image sensor or a CCD image sensor capable of detecting light in a wavelength band of visible light. The imaging unit 140 can receive external light incident on the sensor device 10 through the half mirror 170 and the light point group of the reflection light emitted from the light source unit 150 and multiple-reflected by the first mirror 161, the second mirror 162, and the half mirror 170. That is, the imaging unit 140 can acquire an image obtained by superimposing the light point group of the multiple-reflected reflection light on the captured image of the external space of the sensor device 10. With this configuration, the sensor device 10 can detect the external force acting on the force acting portion 120 from the displacement of the position of each light point of the reflection light multiple-reflected by the first mirror 161, the second mirror 162, and the half mirror 170. Therefore, the sensor device 10 can simultaneously perform imaging of the external space and detection of the external force acting on the force acting portion 120.

As another example, the imaging unit 140 may be an image sensor capable of detecting light in a wavelength band of visible light and light in a wavelength band of infrared light (in particular, short-wavelength infrared light (near-infrared light)). In such a case, the imaging unit 140 can detect characteristics of the object depending on a temperature and moisture content of the object, or infrared absorption characteristics or infrared reflection characteristics of a material as well as the appearance of the object.

Moreover, as another example, the imaging unit 140 may be an image sensor capable of detecting light in a wavelength band of visible light and light having a predetermined polarization. In such a case, the imaging unit 140 can detect stress or strain applied to the object in addition to the appearance of the object.

Moreover, as still another example, the imaging unit 140 may include a distance measurement pixel capable of measuring a distance to the object by using a time of flight (ToF) technology. In such a case, moreover, the sensor device 10 can measure the distance to the object existing in the external space.

Note that the outer edge of the base portion 110 may be further provided with a cylindrical or rectangular cylindrical exterior portion that houses the force acting portion 120 and the reflection space 121 therein. Specifically, the exterior portion may have the base portion 110 as a bottom surface and a round column or square column as a side surface with a height which is a distance from the base portion 110 to the half mirror 170, and configurations of the sensor device 10 may be housed inside the exterior portion. Since the exterior portion can prevent light from the outside of the sensor device 10 from entering the reflection space 121 from the side and being a noise factor, it is possible to improve the stability of the force sense detection using the light point group of the reflection light.

Furthermore, the inner surface of the exterior portion may be a mirror surface or a non-mirror surface. In a case where the inner surface of the exterior portion is a mirror surface, the exterior portion can reflect light emitted to the reflection space 121 from the light source unit 150 and then directed to the outside of the sensor device 10 to the inside of the sensor device 10. Therefore, the exterior portion can increase the number of light points of the reflection light multiple-reflected by the first mirror 161 and the second mirror 162, and thus can detect the external force acting on the force acting portion 120 with higher accuracy.

1.2. Operation

Figure 5:
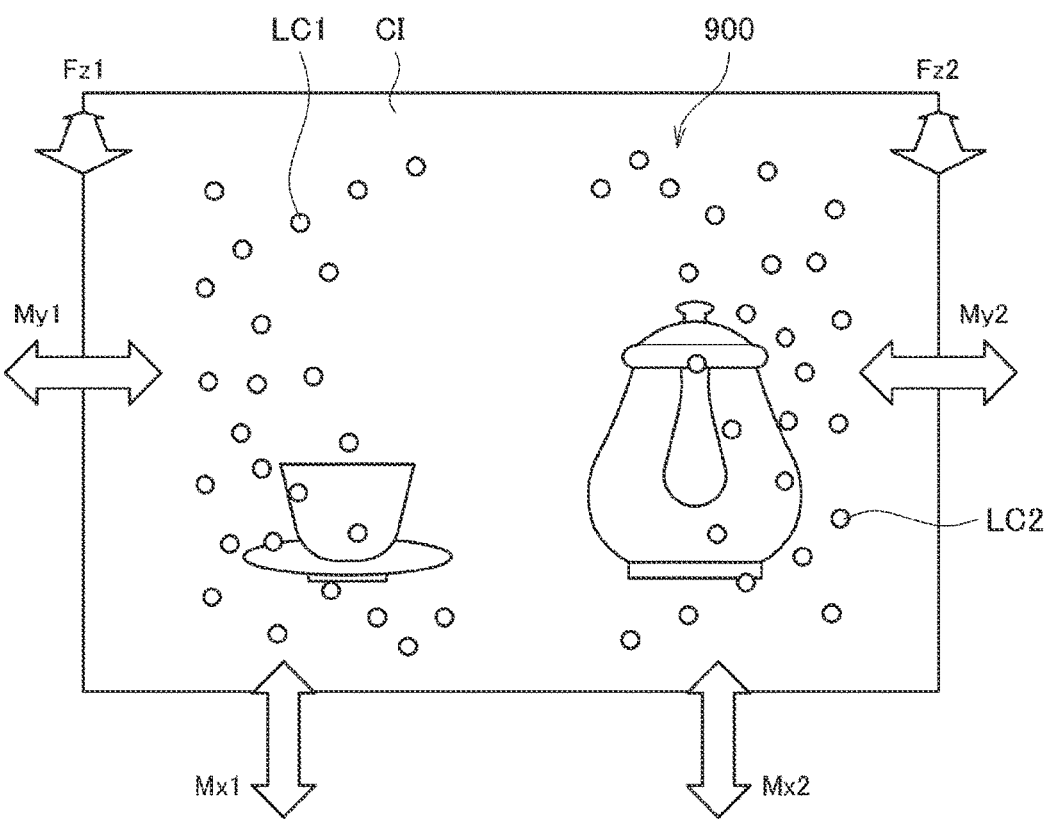
FIG. 5 is an explanatory diagram illustrating an example of an image captured by the sensor device illustrated in FIG. 4.

Next, a function of the sensor device 10 according to the present embodiment will be described with reference to FIGS. 4 to 6. FIG. 4 is an explanatory diagram illustrating imaging by the sensor device 10 and the external force acting on the sensor device 10. FIG. 5 is an explanatory diagram illustrating an example of the image captured by the sensor device 10 illustrated in FIG. 4.

For example, as illustrated in FIG. 4, the sensor device 10 can image a subject 900 existing in an external space. Furthermore, when a force acting portion 120a in the upper portion of FIG. 4 receives a force Fz1 in a Z-axis direction, a moment Mx1 about an X-axis, or a moment My1 about a Y-axis, the sensor device 10 can detect the force Fz1, the moment Mx1, or the moment My1. Moreover, when a force acting portion 120b in the lower portion of FIG. 4 receives a force Fz2 in the Z-axis direction, a moment Mx2 about the X-axis, or a moment My2 about the Y-axis, the sensor device 10 can detect the force Fz2, the moment Mx2, or the moment My2.

Specifically, as illustrated in FIG. 5, an image CI captured by the imaging unit 140 includes a captured image of the subject 900 and light point groups LC1 and LC2.

The light point group LC1 is, for example, a light point group of reflection light emitted from a light source unit 150a in the upper portion of FIG. 4 and multiple-reflected by a first mirror 161a and a second mirror 162a. In a case where the force Fz1, the moment Mx1, or the moment My1 act on the force acting portion 120a, the positions of the force acting portion 120a and 30 the second mirror 162a are displaced. Thus, the position of the light point group LC1 on the image CI is displaced in a direction corresponding to each of the force Fz1, the moment Mx1, and the moment My1, which act on the force acting portion 120a. Therefore, the sensor device 10 can calculate the directions and magnitudes of the force Fz1, moment Mx1, and moment My1 acting on the force acting portion 120a from the displacement of the position of the light point group LC1.

Similarly, a light point group LC2 is, for example, a light point group of light emitted from a light source unit 150b in the lower portion of FIG. 4 and multiple-reflected by a first mirror 161b and a second mirror 162b. In a case where the force Fz2, the moment Mx2, or the moment My2 act on the force acting portion 120b, the positions of the force acting portion 120b and the second mirror 162b are displaced. Thus, the position of the light point group LC2 on the image CI is displaced in a direction corresponding to each of the force Fz2, the moment Mx2, and the moment My2, which act on the force acting portion 120b. Therefore, the sensor device 10 can calculate the directions and magnitudes of the force Fz2, moment Mx2, and moment My2 acting on the force acting portion 120b from the displacement of the position of the light point group LC2.

Therefore, the sensor device 10 can calculate the direction and magnitude of the external force acting on the force acting portion 120a by associating the state of displacement of the position of the light point group LC1 of the reflection light with actual measurement values of the direction and magnitude of the external force acting on the force acting portion 120a in advance.

Furthermore, the sensor device 10 can calculate the direction and magnitude of the external force acting on the force acting portion 120b by associating the state of displacement of the position of the light point group LC2 of the reflection light with actual measurement values of the direction and magnitude of the external force acting on the force acting portion 120b in advance. For example, the sensor device 10 may associate the state of displacement of the position of each of the light point groups LC1 and LC2 of the reflection light with the actual measurement values of the direction and magnitude of the external force acting on each of the force acting portions 120a and 120b by machine learning. Alternatively, the sensor device 10 may associate the state of displacement of the position of each of the light point groups LC1 and LC2 of the reflection light with the actual measurement values of the direction and magnitude of the external force acting on each of the force acting portions 120a and 120b by creating a calibration curve.

Therefore, the sensor device 10 can obtain the image CI obtained by superimposing the light point groups LC1 and LC2 on the captured image of the subject 900, and thus it is possible to simultaneously measure the force and moment acting on the force acting portions 120a and 120b while imaging the subject 900.

The operation of the sensor device 10 will be described with reference to FIG. 6. FIG. 6 is a block diagram illustrating a flow of space imaging operation and force sense calculation operation performed by the sensor device 10.

Figure 6:
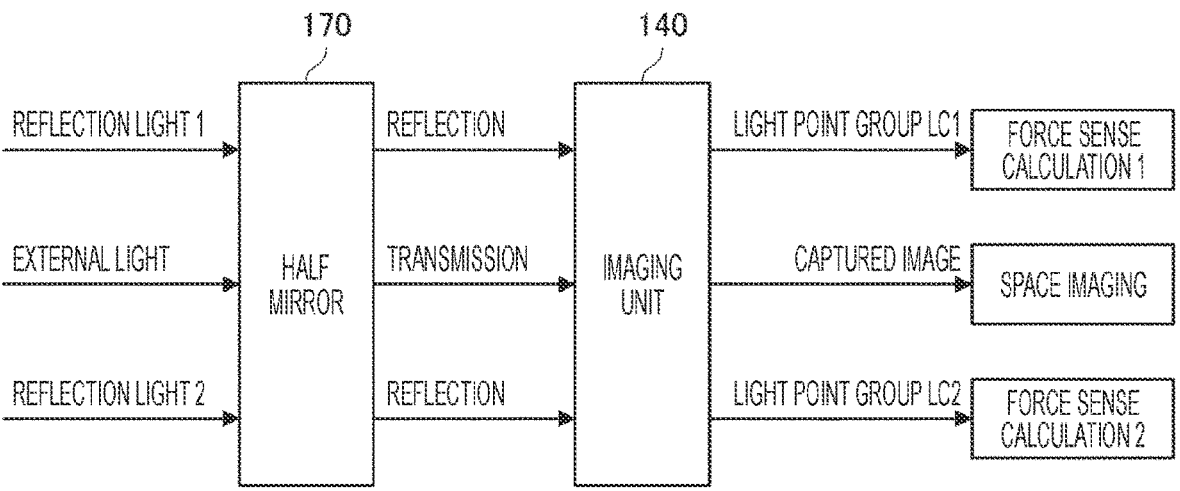
FIG. 6 is a block diagram illustrating a flow of space imaging operation and force sense calculation operation performed by a sensor device.

As illustrated in FIG. 6, in the sensor device 10, first, the external light incident on the sensor device and reflection light 1 and reflection light 2 multiple-reflected inside the sensor device 10 are 10 incident on the half mirror 170. The light transmitted through the half mirror 170 among the external light incident on the sensor device 10 and the light reflected by the half mirror 170 among the reflection light 1 and the reflection light 2 are incident on the imaging unit 140 via the light intake hole 110H. As a result, the imaging unit 140 acquires an image obtained by superimposing the captured image generated from the external light, the light point group LC1 generated from the reflection light 1, and the light point group LC2 generated from the reflection light 2.

With this configuration, the sensor device 10 can image the external space of the sensor device 10 from the captured image generated from the external light (space imaging). Furthermore, the sensor device 10 can calculate a force or a moment acting on the force acting portion 120a on the basis of the light point group LC1 generated from the reflection light 1 (force sense calculation 1). Moreover, the sensor device 10 can calculate a force or a moment acting on the force acting portion 120b on the basis of the light point group LC2 generated from the reflection light 2 (force sense calculation 2).

The sensor device 10 including the configurations described above can receive the external light incident on the sensor device 10 through the half mirror 170, the reflection light multiple-reflected inside the sensor device 10 simultaneously by using the imaging unit 140. Therefore, the sensor device 10 can perform imaging of the external space based on the external light and detection of a force sense calculated from the multiple-reflected reflection light with a smaller and simpler mechanism. Furthermore, since the sensor device 10 can simultaneously acquire the captured image of the external space and the multiple-reflected reflection light by using the imaging unit 140, it is possible to synchronize the captured image of the external space with the detection result of the external force acting on the sensor device 10.

In the sensor device 10, the light emitted from the light source unit 150 is multiple-reflected by the first mirror 161 and the second mirror 162, which faces each other. With this configuration, since the sensor device 10 can increase the number of light points and the displacement of the position of the reflection light captured by the imaging unit 140 by multiple reflection, the sensitivity of the force sense detection can be improved, and noise can be reduced. Furthermore, the sensor device 10 can further expand the dynamic range of the force sense detection by increasing the number of light points of the reflection light captured by the imaging unit 140.

1.3. Modification Example

Next, first to fourth modification examples of the sensor device 10 according to the present embodiment will be described with reference to FIGS. 7 to 13.

First Modification Example

Figure 7:
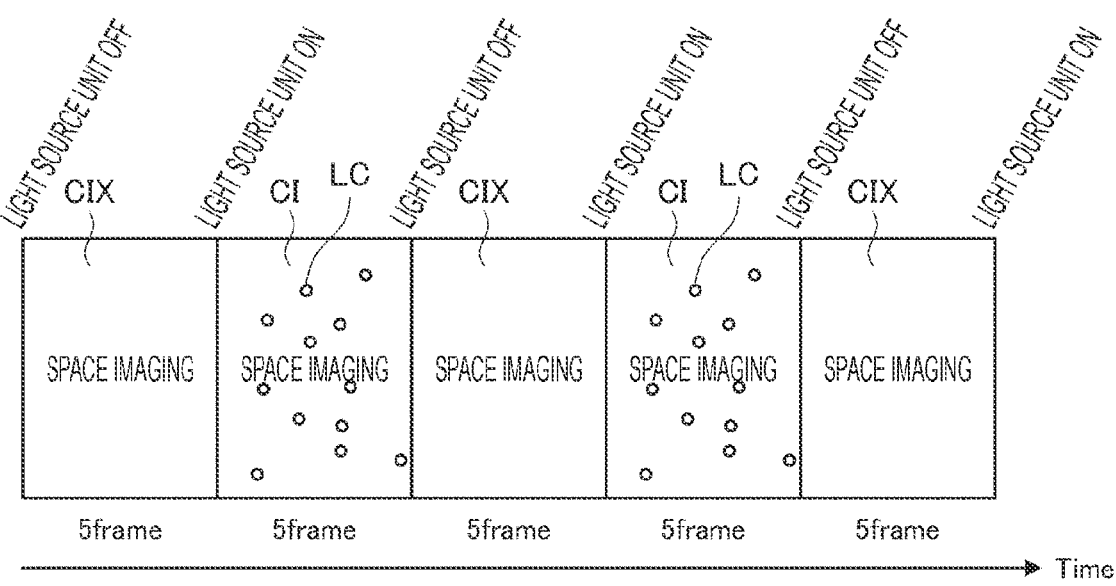
FIG. 7 is an explanatory diagram illustrating a relationship between an imaging timing of a sensor device and an on/off timing of a light source unit according to a first modification example of the first embodiment.

FIG. 7 is an explanatory diagram illustrating a relationship between an imaging timing of the sensor device 10 and an on/off timing of the light source unit 150 according to a first modification example.

As illustrated in FIG. 7, in the sensor device 10 according to the first modification example, emission of light from the light source unit 150 may be controlled in synchronization with a frame rate of imaging by the imaging unit 140. Specifically, the on/off of light emission from the light source unit 150 may be switched every several frames of imaging by the imaging unit 140. For example, the on/off of light emission from the light source unit 150 may be switched every five frames in synchronization with the frame rate of imaging by the imaging unit 140. Therefore, the imaging unit 140 can alternately capture the image CI on which a light point group LC of the reflection light of the light emitted from the light source unit 150 is superimposed and an image CIX on which the light point group LC is not superimposed every several frames.

Therefore, the imaging unit 140 can separately capture the image CI for detecting the external force acting on the force acting portion 120, on which the light point group LC is superimposed, and the image CIX for imaging the external space, on which the light point group LC is not superimposed. In such a case, the sensor device 10 can prevent the captured image of the external space and the light point group LC for detecting the external force acting on the force acting portion 120 from being mutual noise factors. Therefore, the sensor device 10 can perform both the imaging of the external space and the detection of the force sense with lower noise.

In the sensor device 10 according to the first modification example, the light source unit 150 may be an LED light source capable of switching on/off of the light emission at high speed, and the imaging unit 140 may be an event base vision sensor (EVS). The EVS is an imaging device that outputs only data of a pixel of which luminance has changed. Since the EVS outputs only data of the pixel of which luminance has changed, it is possible to perform imaging at an extremely high frame rate (for example, about 10 kFPS) as compared with a normal RGB camera. Therefore, in a case where the imaging unit 140 is the EVS, the sensor device 10 can switch the image CI on which the light point group LC is superimposed and the image CIX on which the light point group LC is not superimposed at high speed to perform imaging. Therefore, the sensor device 10 can more smoothly detect the external force acting on the force acting portion 120 while separately capturing the image CIX for imaging the external space and the image CI for detecting the external force acting on the force acting portion 120.

Second Modification Example

Figure 8:
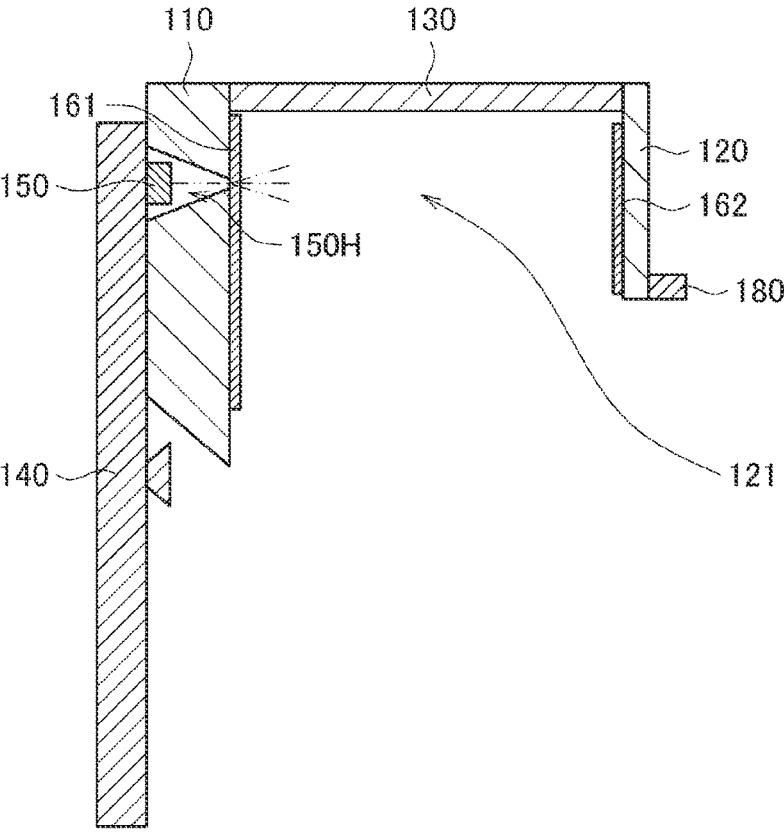
FIG. 8 is a cross-sectional view illustrating a configuration near a light source unit of a sensor device according to a second modification example of the first embodiment.

FIG. 8 is a cross-sectional view illustrating a configuration near the light source unit 150 of the sensor device 10 according to a second modification example.

As illustrated in FIG. 8, in the sensor device 10 according to the second modification example, the light source unit 150 may emit light to the reflection space 121 via the conical pinhole 150H. Specifically, the pinhole 150H is a conical hole that tapers toward the reflection space 121 side. The light source unit 150 emits light to the reflection space 121 through the conical pinhole 150H such that the light can be diffused in a wider area as compared with a case where the light is emitted to the reflection space 121 through a linear pinhole. Thus, the light source unit 150 can further increase the number of light points of the reflection light multiple-reflected by the first mirror 161 and the second mirror 162. Therefore, the sensor device 10 can detect the external force acting on the force acting portion 120 with higher accuracy.

Third Modification Example

Figure 9:
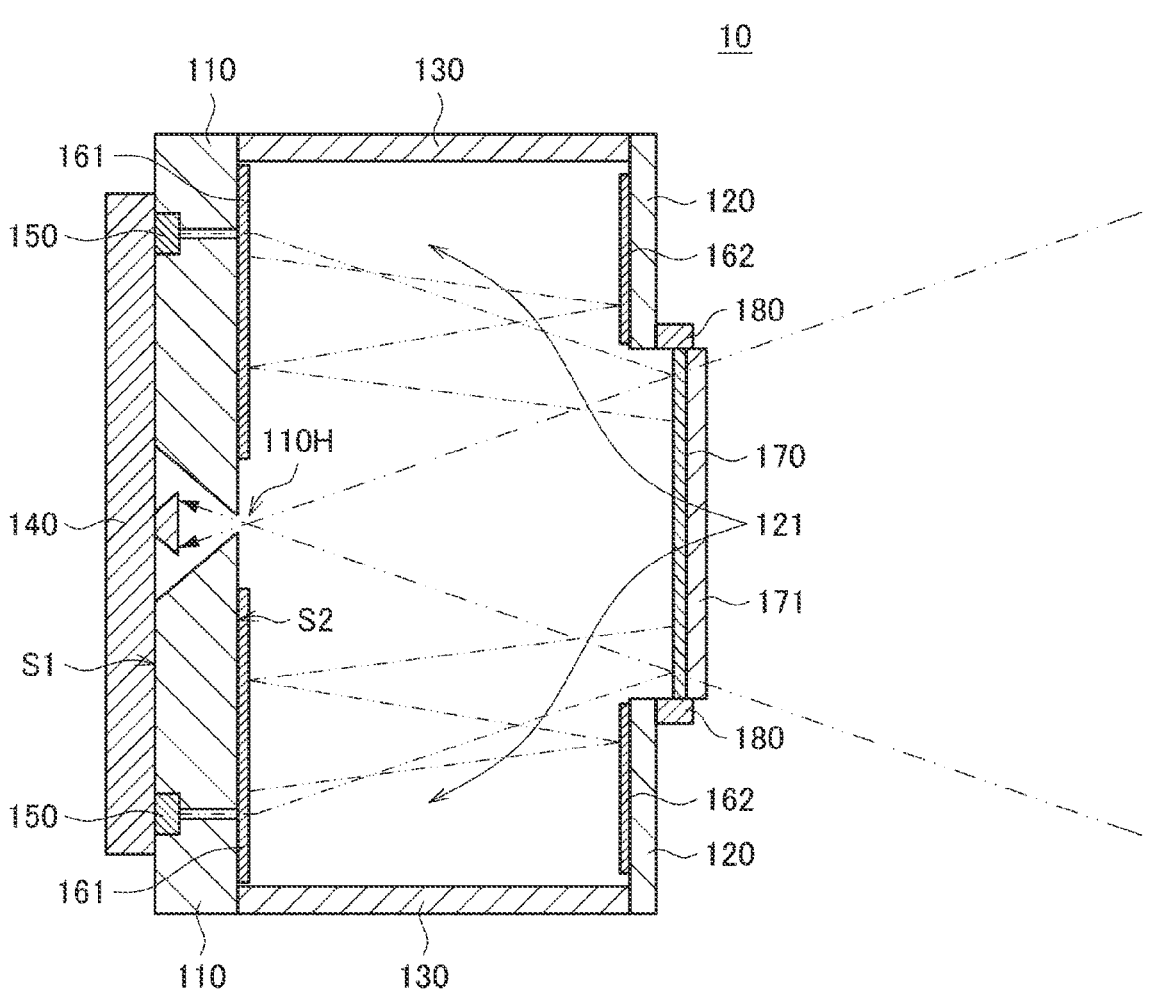
FIG. 9 is a cross-sectional view illustrating a configuration of a sensor device according to a third modification example of the first embodiment.

FIG. 9 is a cross-sectional view illustrating a configuration of the sensor device 10 according to a third modification example.

As illustrated in FIG. 9, in the sensor device 10 according to the third modification example, an infrared cut filter 171 may be provided on any one surface of the half mirror 170. Specifically, the infrared cut filter 171 is a filter that selectively cuts (absorbs) infrared light and transmits visible light. For example, the infrared cut filter 171 may be provided on a surface of the half mirror 170 on a side on which the external light is incident.

In such a case, the sensor device 10 according to the third modification example can prevent infrared light included in the external light from entering the sensor device 10. Therefore, the sensor device 10 according to the third modification example converts light emitted from the light source unit 150 into infrared light, and thus can image the external space with the visible light and detect the external force acting on the force acting portion 120 with a light point group of reflection light of the infrared light. That is, the sensor device 10 according to the third modification example can separate the wavelength band of the light used for detecting the external force acting on the force acting portion 120 and the wavelength band of the light used for imaging the external space from each other. Therefore, the sensor device 10 according to the third modification example can prevent the light used for detecting the external force acting on the force acting portion 120 and the light used for imaging the external space from interfering with each other.

Fourth Modification Example

Figure 10:
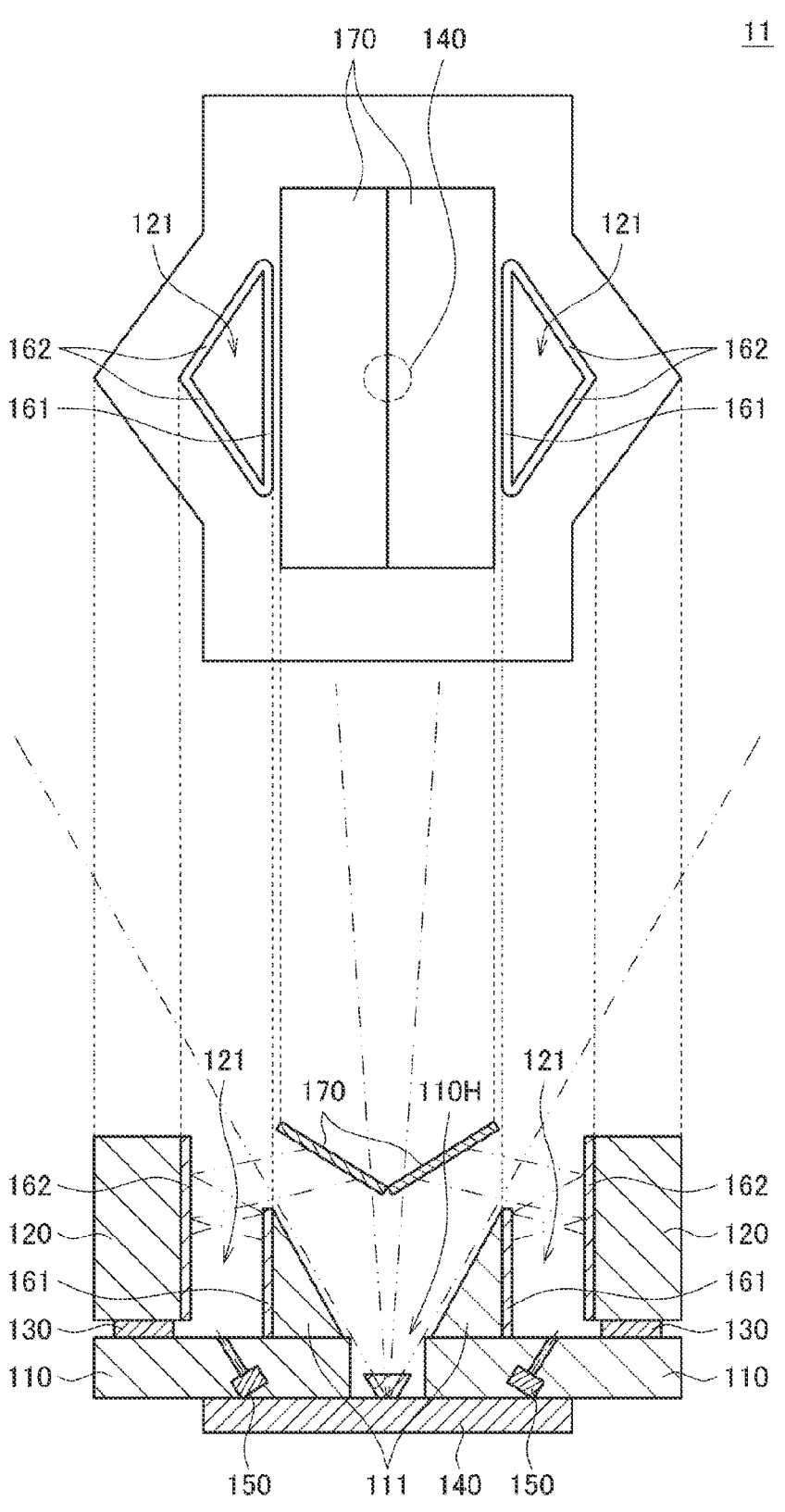
FIG. 10 is an explanatory diagram illustrating a top view and a cross-sectional view of an example of a configuration of a sensor device according to a fourth modification example of the first embodiment.
Figure 11:
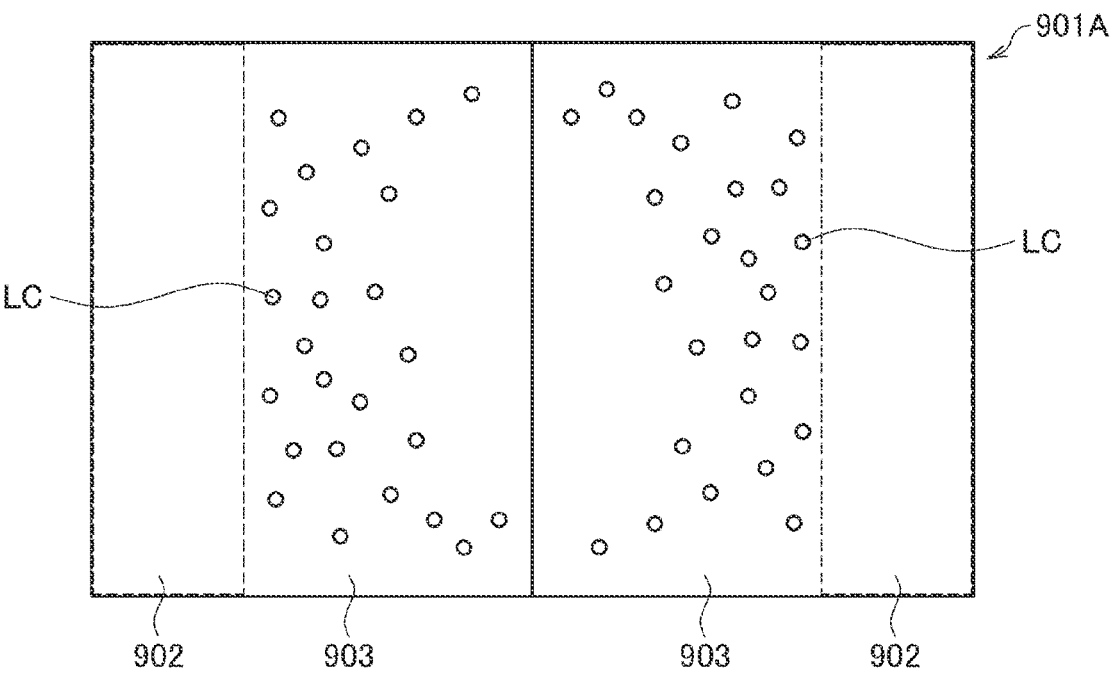
FIG. 11 is a schematic diagram illustrating an example of an image captured by an imaging unit of the sensor device illustrated in FIG. 10.
Figure 12:
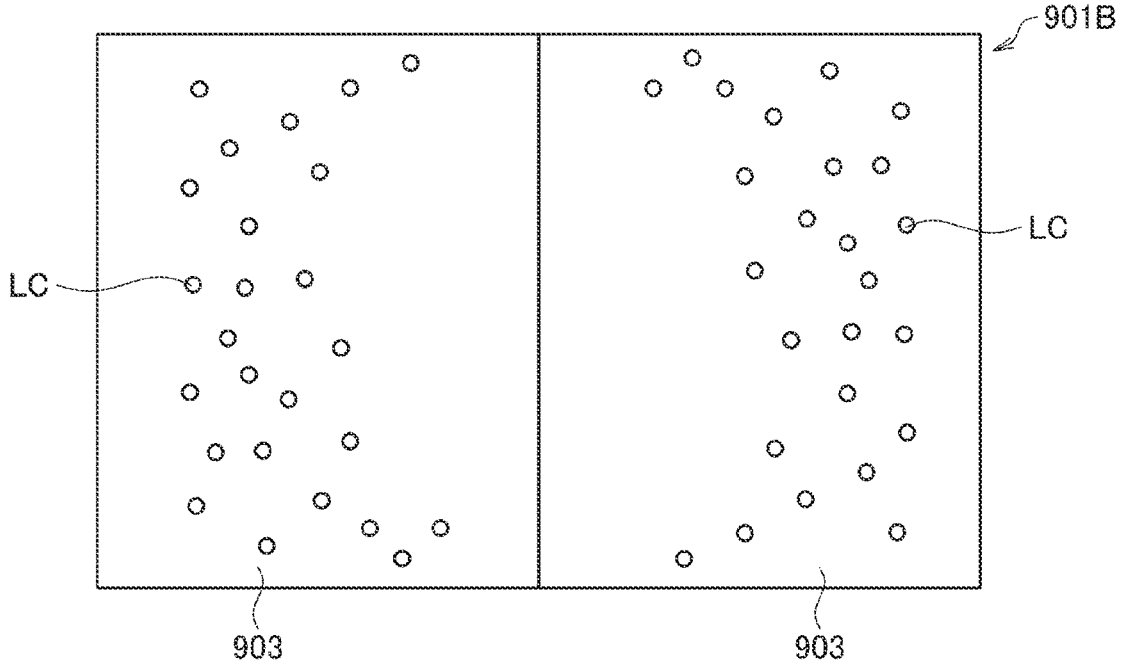
FIG. 12 is a schematic diagram illustrating another example of an image captured by an imaging unit of the sensor device illustrated in FIG. 10.

FIG. 10 is an explanatory diagram illustrating a top view and a cross-sectional view of an example of a configuration of a sensor device 11 according to a fourth modification example. FIG. 11 is a schematic diagram illustrating an example of an image captured by the imaging unit 140 of the sensor device 11 illustrated in FIG. 10. FIG. 12 is a schematic diagram illustrating another example of an image captured by the imaging unit 140 of the sensor device 11 illustrated in FIG. 10.

As illustrated in FIG. 10, in the sensor device 11 according to the fourth modification example, the half mirror 170 may be provided on the incident side of the external light at an oblique angle with respect to the light intake hole 110H. Specifically, in the half mirror 170 using the dielectric multilayer film, the loss of light can be reduced when the light is incident obliquely (for example, when the light is incident at an incident angle of about 45 degrees). Therefore, by providing the half mirror 170 such that the external light incident on the sensor device 11 and the reflection light multiple-reflected by the first mirror 161 and the second mirror 162 are obliquely incident, the sensor device 11 can more efficiently receive the incident light by the imaging unit 140.

Specifically, as illustrated in FIG. 10, the base portion 110 is provided with a pair of force acting portions 120 via the flexible bodies 130 on both sides of the light intake hole 110H as the center. Furthermore, a pair of protrusions 111 are provided on the base portion 110 between a pair of the force acting portions 120 so as to respectively face the force acting portions 120. The first mirror 161 and the second mirror 162 are provided on the surfaces of the force acting portion 120 and each of the protrusions 111, the surfaces facing each other, and the light source unit 150 emits light to the reflection space 121 between the first mirror 161 and the second mirror 162.

In FIG. 10, the half mirror 170 is provided so as to be capable of reflecting the reflection light from the second mirrors 162 provided on a pair of the force acting portions 120 to the imaging unit 140. For example, the half mirror 170 may be provided to have a valley fold shape above the light intake hole 110H, and may reflect the reflection light from the second mirror 162 provided on each of the force acting portions 120 to the imaging unit 140.

With this configuration, the reflection light multiple-reflected between the first mirror 161 and the second mirror 162 is obliquely incident on the half mirror 170 provided above the light intake hole 110H and reflected toward the imaging unit 140. Furthermore, the external light incident from the outside of the sensor device 11 is obliquely incident on the half mirror 170 and transmitted to the imaging unit 140 side. Therefore, the sensor device 11 can receive the external light from the external space and the reflection light multiple-reflected by the first mirror 161 and the second mirror 162 by the imaging unit 140.

Note that in the sensor device 11 illustrated in FIG. 10, the half mirror 170 can be replaced with a normal mirror. Specifically, the sensor device 11 illustrated in FIG. 10 may include a mirror provided to cover only the central portion of an angle of view of the imaging unit 140 so as not to completely shield light incident on the imaging unit 140 from the external space. In such a case, the imaging unit 140 can simultaneously image the reflection light of the light emitted from the light source unit 150 and reflected by the mirror and the external space entering from the angle of view of the outer edge portion not covered by the mirror.

In such a case, for example, as illustrated in FIG. 11, the imaging unit 140 of the sensor device 11 illustrated in FIG. 10 can capture an image 901A including a force sense detection region 903 disposed at the central portion of the angle of view and imaging regions 902 disposed at the outer edge portions on both sides of the angle of view.

The force sense detection region 903 is a region in which the light point group LC of the reflection light of the light emitted from the light source unit 150 is seen, and is disposed at the central portion of the angle of view corresponding to a region in which the mirror is provided. The imaging regions 902 are regions in which the external space is seen, and are disposed at outer edge portions on both sides of the angle of view corresponding to a region other than the region in which the mirror is provided. That is, in the image 901A, the force sense detection region 903 for detecting the external force acting on the force acting portion 120 and the each of the imaging regions 902 for imaging the external space are disposed separately from each other.

Furthermore, for example, as illustrated in FIG. 12, the imaging unit 140 of the sensor device 11 illustrated in FIG. 10 may capture an image 901B including only the force sense detection region 903 in which the light point group LC of the reflection light of the light emitted from the light source unit 150 is seen. In such a case, the sensor device 11 illustrated in FIG. 10 is configured as a small sensor capable of detecting force senses at a plurality of sites. Therefore, the sensor device 11 illustrated in FIG. 10 can detect the external force acting on a plurality of the force acting portions 120 in synchronization with each other. Furthermore, since the sensor device 11 illustrated in FIG. 10 can expand a region in which the light point group LC of the reflection light of the light emitted from the light source unit 150 is imaged, the dynamic range of the force sense detection can be further expanded.

Figure 13:
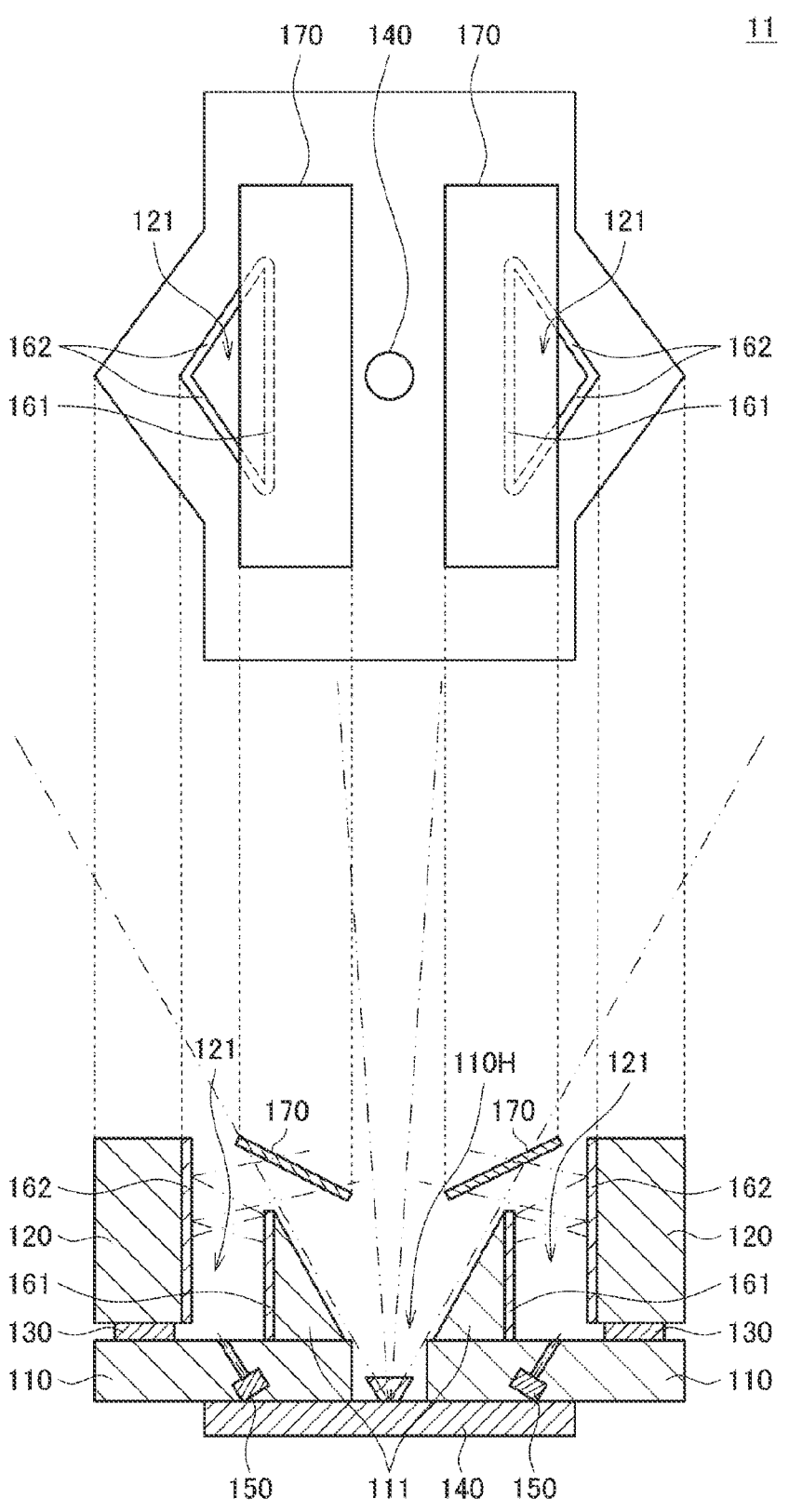
FIG. 13 is an explanatory diagram illustrating a top view and a cross-sectional view of another example of a configuration of a sensor device according to the fourth modification example of the first embodiment.

FIG. 13 is a schematic diagram illustrating a top view and a cross-sectional view of another example of a configuration of the sensor device 11 according to the fourth modification example. As illustrated in FIG. 13, in the sensor device 11 according to the fourth modification example, the half mirror 170 is provided on the incident side of the external light at an oblique angle with respect to the light intake hole 110H. Moreover, in FIG. 13, the half mirrors 170 are separated from each other and provided near the protrusions 111 at an angle at which the reflection light from the second mirror 162 can be reflected by the imaging unit 140. The half mirrors 170 may be provided so as not to cover the light intake hole 110H and not to block the external light incident from the outside of the sensor device 11.

With this configuration, the reflection light multiple-reflected between the first mirror 161 and the second mirror 162 is obliquely incident on the half mirror 170 provided above the light intake hole 110H and reflected toward the imaging unit 140. Furthermore, the external light incident from the outside of the sensor device 11 is incident on the imaging unit 140 without passing through the half mirrors 170 in a part of a field of view, and passes through the half mirrors 170 and is incident on the imaging unit 140 in a part of the field of view. In such a case, since the imaging unit 140 can receive the external light that is not reflected or absorbed by the half mirror 170 in a part of the field of view, it is possible to acquire a clearer captured image of the external space. Therefore, the sensor device 11 can receive the external light from the external space and the reflection light multiple-reflected by the first mirror 161 and the second mirror 162 with the imaging unit 140.

Figure 14:
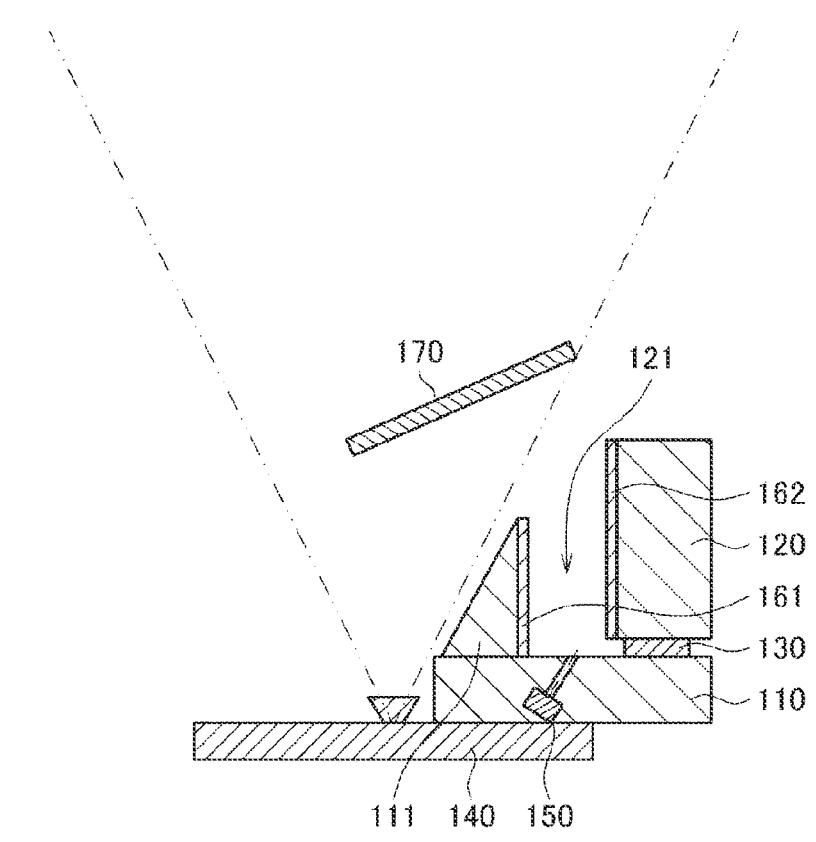
FIG. 14 is a cross-sectional view illustrating another example of a configuration of a sensor device according to the fourth modification example of the first embodiment.
Figure 15:
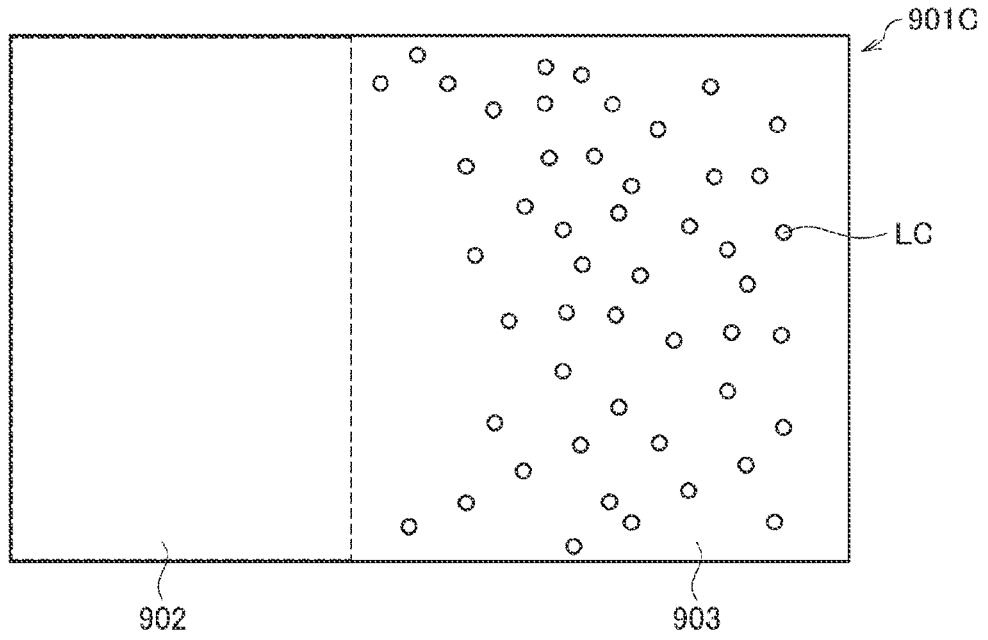
FIG. 15 is a schematic diagram illustrating an example of an image captured by an imaging unit of the sensor device illustrated in FIG. 14.

FIG. 14 is a cross-sectional view illustrating still another example of a configuration of the sensor device 11 according to the fourth modification example. FIG. 15 is a schematic diagram illustrating an example of an image captured by the imaging unit 140 of the sensor device 11 illustrated in FIG. 14.

As illustrated in FIG. 14, the sensor device 11 according to the fourth modification example may include a structure including a force acting portion 120, a flexible body 130, a light source unit 150, a first mirror 161, a second mirror 162, and a half mirror 170 on only one side of the imaging unit 140. The sensor device 11 illustrated in FIG. 14 can detect the external force acting on the force acting portion 120 provided on one side. Note that the half mirror 170 may be replaced with a normal mirror that does not transmit light.

In such a case, for example, as illustrated in FIG. 15, the imaging unit 140 of the sensor device 11 illustrated in FIG. 14 can capture an image 901C including a force sense detection region 903 occupying most of the angle of view and an imaging region 902 occupying an extremely small part of the angle of view.

The force sense detection region 903 is a region in which the light point group LC of the reflection light of the light emitted from the light source unit 150 is at least seen, and is disposed in a region which corresponds to a region in which the half mirror 170 is provided and which occupies the majority of the angle of view. Note that in the force sense detection region 903, only the light point group LC of the reflection light of the light emitted from the light source unit 150 may be seen, or the light point group LC and the external space may be superimposed and seen. The imaging region 902 is a region in which the external space is seen, and is disposed in a region less than half the angle of view corresponding to a region other than the region in which the half mirror 170 is provided.

In the sensor device 11 illustrated in FIG. 14, most of the angle of view of the captured image 901C is the force sense detection region 903 for detecting the external force acting on the force acting portion 120. Therefore, in the sensor device 11 illustrated in FIG. 14, the number of light points of the reflection light included in the captured image 901C can be further increased, and thus noise resistance in force sense detection can be further increased.

Figure 16:
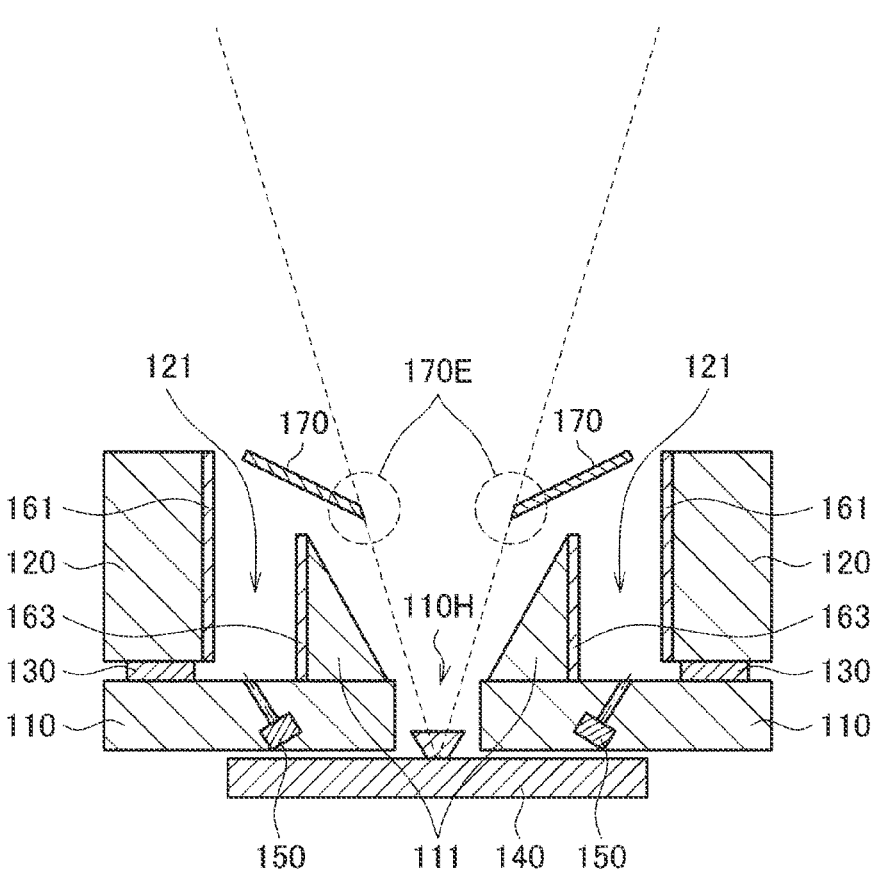
FIG. 16 is a cross-sectional view illustrating still another example of the sensor device illustrated in FIG. 13.

FIG. 16 is a cross-sectional view illustrating still another example of the sensor device 11 illustrated in FIG. 13. As illustrated in FIG. 16, in a case where the external light incident from the outside of the sensor device 11 is incident on the imaging unit 140 without passing through the half mirror 170, the half mirror 170 may have an end surface 170E cut in parallel with a light beam direction of the light incident on the imaging unit 140 from the external space. In such a case, the sensor device 11 can prevent the external light incident from the outside of the sensor device 11 from being reflected or the like by the end surface 170E of the half mirror 170. Therefore, the sensor device 11 can prevent the image of the external space captured by the imaging unit 140 from being distorted at the end surface 170E of the half mirror 170.

Furthermore, the end surface 170E of the half mirror 170 may be painted black such that the light emitted from the light source unit 150 does not generate a bright point on the end surface 170E of the half mirror 170. The black color is, for example, an achromatic color having brightness of 30% or less in an HSV color space. Therefore, the sensor device 11 can prevent the light emitted from the light source unit 150 from passing through the half mirror 170 and being a bright point on the end surface 170E of the half mirror 170, and thus it is possible to prevent the bright point from hindering the field of view of the external space.

Fifth Modification Example

The sensor device 10 according to the fifth modification example can be further provided with various sensors.

For example, in the sensor device 10 according to the fifth modification example, a microphone may be provided on a member other than the force acting portion 120. In such a case, the contact sound is collected by the microphone when the external force acts on the force acting portion 120, and thus the sensor device 10 can artificially detect the tactile sense at the time of contact of the external force acting on the force acting portion 120 with collected sound wave vibration in a high frequency band. Furthermore, the sensor device 10 can detect or predict a failure or the like of the sensor device 10 by collecting, with a microphone, an abnormal sound generated from the imaging unit 140 or the light source unit 150 inside the sensor device 10, a drive unit outside the sensor device 10, or the like.

For example, the sensor device 10 according to the fifth modification example may be further provided with a temperature sensor. In such a case, when the temperature of the sensor device 10 is detected by the temperature sensor, the sensor device 10 can detect the external force by correcting the expansion or contraction of the base portion 110 and force acting portion 120, which is caused by the temperature change. Specifically, the structural members such as the base portion 110 and the force acting portion 120 expand or contract depending on the temperature change. Therefore, the position of each light point of the reflection light multiple-reflected by the first mirror 161 and the second mirror 162 may be displaced due to the expansion or contraction of the base portion 110 and the force acting portion 120 even when the temperature changes. Therefore, the sensor device 10 corrects the expansion or contraction of the base portion 110 and the force acting portion 120 on the basis of the temperature detected by the temperature sensor, and thus the external force can be detected with higher accuracy. Furthermore, the sensor device 10 can detect a failure or the like of the sensor device 10 by detecting, by the temperature sensor, abnormal heat generated from the imaging unit 140 or the light source unit 150 inside the sensor device 10, a drive unit outside the sensor device 10, or the like.

For example, the sensor device 10 according to the fifth modification example may be further provided with an illuminance sensor that detects brightness of the external space. In such a case, the sensor device 10 can further improve the detection sensitivity of the light point group of the reflection light multiple-reflected by the first mirror 161 and the second mirror 162 by changing the luminance of the light emitted from the light source unit 150 according to the brightness of the external space.

For example, the sensor device 10 according to the fifth modification example may be further provided with an inertial measurement unit (IMU) that detects three-dimensional acceleration and angular velocity. In such a case, the sensor device 10 can calculate the orientation or movement state of the sensor device 10 on the basis of the three-dimensional acceleration and angular velocity detected by the IMU. Therefore, the sensor device 10 can detect the external force acting on the force acting portion 120 in consideration of the influence of the orientation or movement state of the sensor device 10.

For example, the sensor device 10 according to the fifth modification example may be further provided with an illumination unit (not illustrated) that illuminates the external space. In such a case, since the sensor device 10 can illuminate the external space with the illumination unit, it is possible to acquire a clearer captured image of the external space. The illumination unit that illuminates the external space may emit light of a wavelength band different from the wavelength band of the light emitted by the light source unit 150. For example, the illumination unit and the light source unit 150 may emit light of different colors. Therefore, the sensor device 10 can prevent the light emitted from the illumination unit for illuminating the external space and the reflection light of the light emitted from the light source unit 150 from interfering with each other and being noise.

Second Embodiment (Sensor Device)

Figure 17:
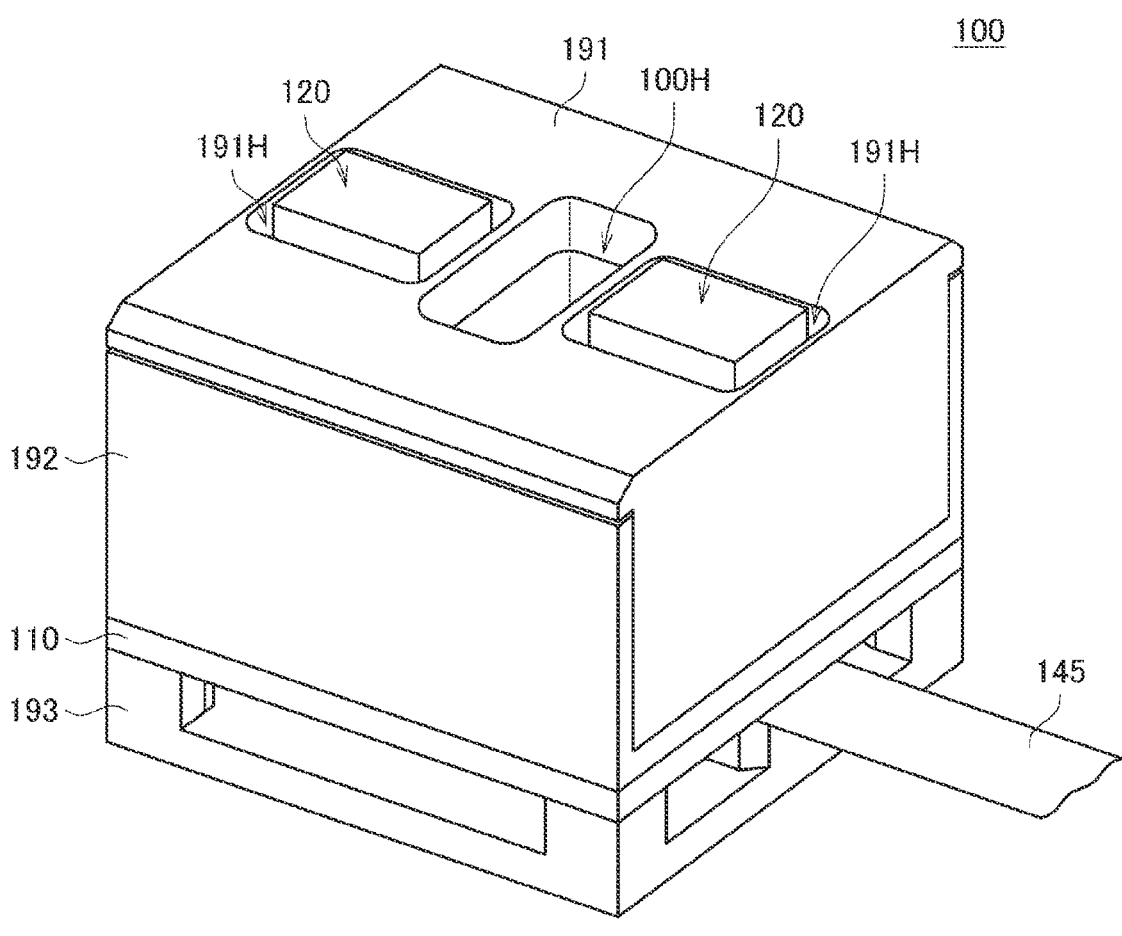
FIG. 17 is a perspective view schematically illustrating a configuration of a sensor device according to a second embodiment of the present disclosure.
Figure 18:
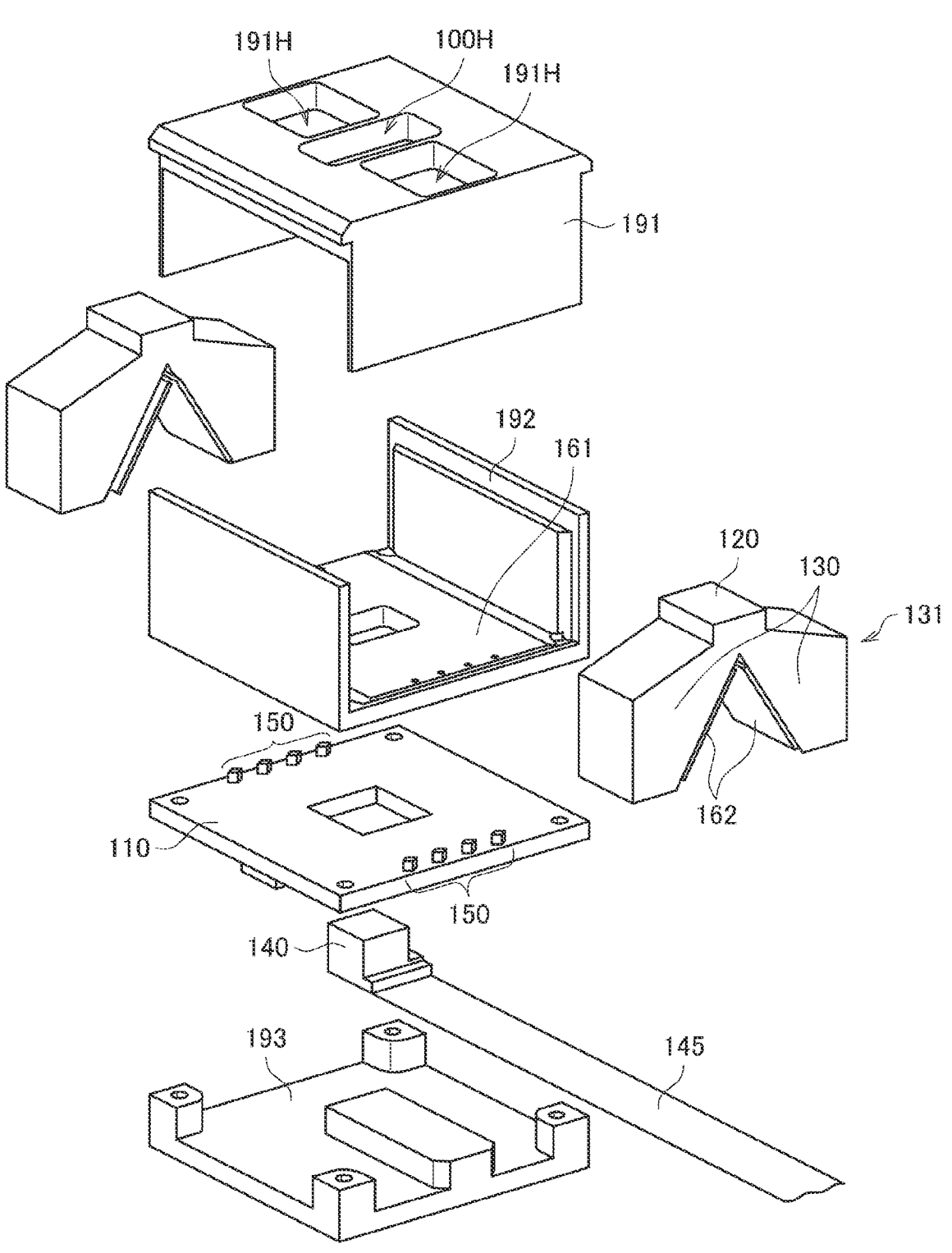
FIG. 18 is an exploded view schematically illustrating a configuration of a sensor device according to the second embodiment.
Figure 19:
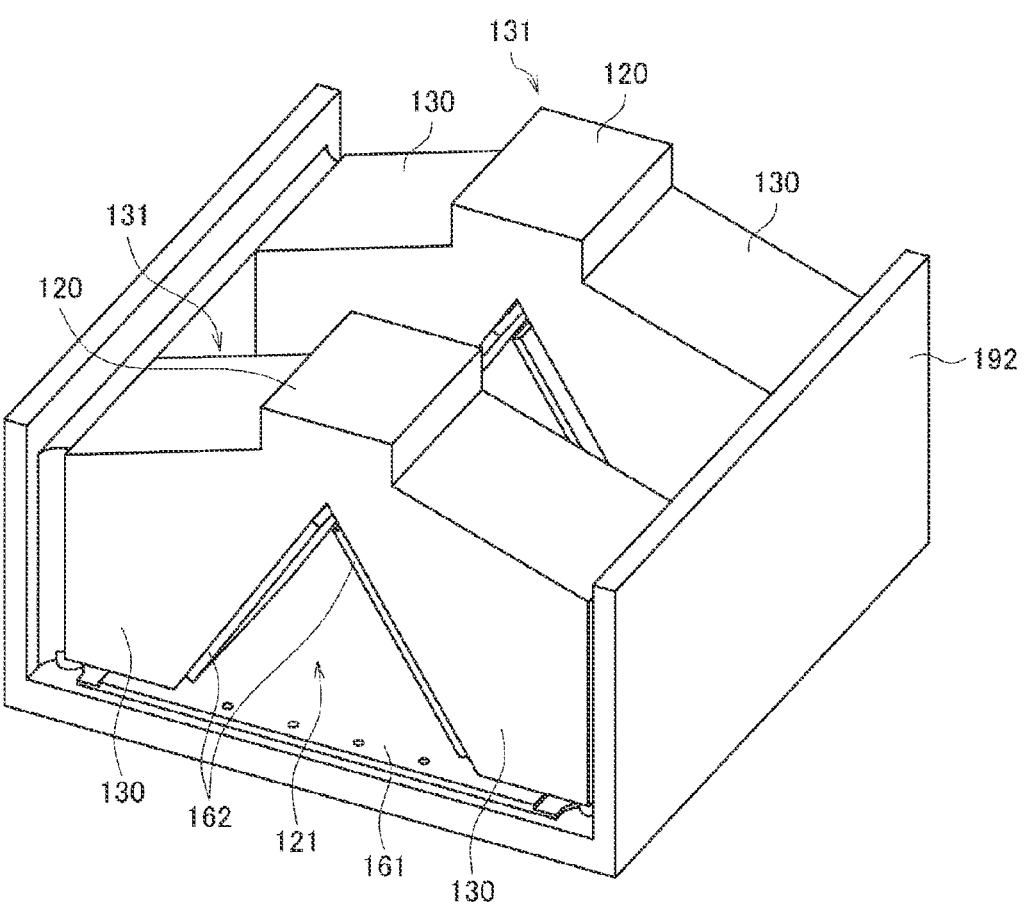
FIG. 19 is a perspective view illustrating attachment of a force sense detection structure with respect to a second exterior portion.
Figure 20:
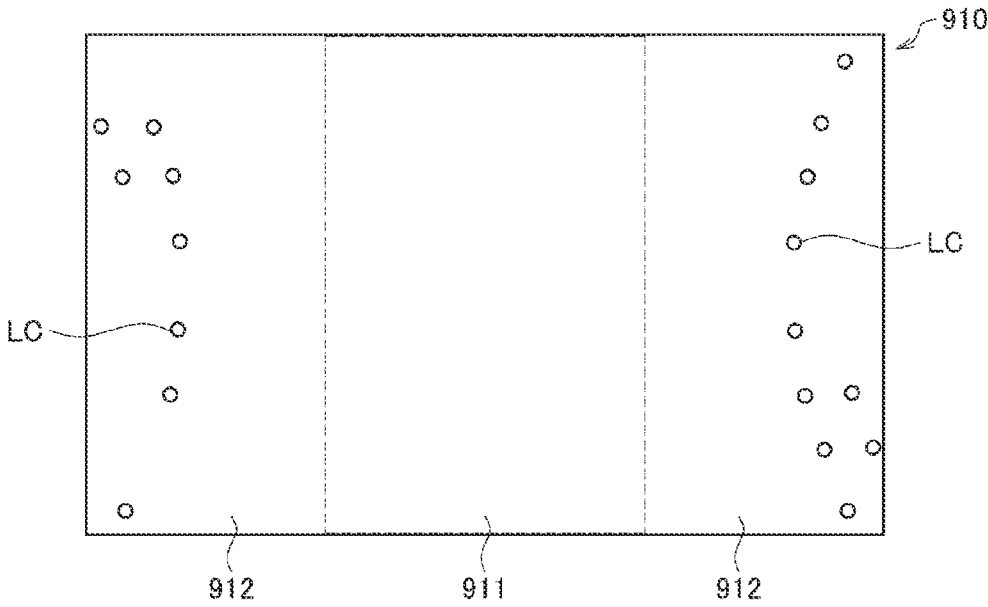
FIG. 20 is a schematic diagram illustrating an example of an image captured by an imaging unit of a sensor device.

First, a configuration of a sensor device according to a second embodiment of the present disclosure is described with reference to FIGS. 17 to 20. FIG. 17 is a perspective view schematically illustrating a configuration of a sensor device 100 according to the present embodiment. FIG. 18 is an exploded view schematically illustrating a configuration of the sensor device 100 according to the present embodiment. FIG. 19 is a perspective view illustrating attachment of a force sense detection structure 131 with respect to a second exterior portion 192. FIG. 20 is a schematic diagram illustrating an example of an image captured by the imaging unit 140 of the sensor device 100.

As illustrated in FIG. 17 and FIG. 18, the sensor device 100 includes a first exterior portion 191, a second exterior portion 192, a force sense detection structure 131, a first mirror 161, a second mirror 162, a base portion 110, an imaging unit 140, a light source unit 150, and a third exterior portion 193.

The first exterior portion 191 is a part of a casing of the sensor device 100. Specifically, the first exterior portion 191 is a structural member that covers the upper surface of the sensor device 100 and two side surfaces of the sensor device 100, which face each other. On the upper surface of the first exterior portion 191, an opening 191H for exposing the force acting portion 120 of the force sense detection structure 131 to the outside and an external light intake port 100H for taking in the external light incident on the imaging unit 140 are provided.

The second exterior portion 192 is a part of a casing of the sensor device 100. Specifically, the second exterior portion 192 is a structural member that covers the lower surface of the sensor device 100 and two side surfaces of the sensor device 100, which face each other. The second exterior portion 192 can constitute a rectangular parallelepiped casing by being fitted to the first exterior portion 191. On the lower surface of the second exterior portion 192, an opening for guiding the external light incident via the external light intake port 100H to the imaging unit 140 is provided.

The force sense detection structure 131 is a structure including a force acting portion 120 and a flexible body 130. As illustrated in FIG. 19, the force sense detection structure 131 is attached to two side surfaces of the second exterior portion 192, which face each other, via the flexible body 130. Since the force sense detection structure 131 is attached to two side surfaces of the second exterior portion 192, which face each other, deformation in X, Y, and Z axial directions can be easily kept balanced as compared with a case where the force sense detection structure 131 is attached to the lower surface of the second exterior portion 192. Therefore, the force sense detection structure 131 can further increase the degree of freedom in structural design.

The force acting portion 120 is provided as a protrusion and is exposed to the outside through the opening 191H provided on the first exterior portion 191. The flexible body 130 is provided to spread from the lower portion of the force acting portion 120 to both sides, and the force acting portion 120 is attached to two side surfaces of the second exterior portion 192, which face each other. The flexible body 130 may be configured with a low-rigidity structure so as to be more easily deformed than other configurations. The force sense detection structure 131 can deform the flexible body 130 on the lower portion of the force acting portion 120 when the external force acts on the force acting portion 120.

Furthermore, the force acting portion 120 may be provided such that a gap between the force acting portion 120 and the outer edge of the opening 191H of the first exterior portion 191 is smaller than the allowable deformation amount of the flexible body 130. Therefore, since the force sense detection structure 131 can limit the deformation amount of the flexible body 130 by the size of the opening 191H of the first exterior portion 191, it is possible to prevent an excessive deformation load from being applied to the flexible body 130. Note that an elastic member such as rubber or elastomer may be disposed between the force acting portion 120 and the outer edge of the opening 191H of the first exterior portion 191 in order to improve water-proofness.

The first mirror 161 is provided on the lower surface of the second exterior portion 192, and the second mirror 162 is provided on the flexible body 130 of the force sense detection structure 131 so as to face the first mirror 161. As illustrated in FIG. 19, the first mirror 161 and the second mirror 162 are provided at positions respectively corresponding to side surfaces of the triangular column, and thus the light emitted from the light source unit 150 can be multiple-reflected in the reflection space 121 between the first mirror 161 and the second mirror 162.

The base portion 110 is provided on the back surface of the second exterior portion 192 which is the opposite side to the lower surface on which the first mirror 161 is provided. The base portion 110 is provided with a plurality of the light source units 150 that emits light to the reflection space 121. Furthermore, the base portion 110 may be provided with various sensors that sense information of a space surrounded by the first exterior portion 191 and the second exterior portion 192. For example, the base portion 110 may be provided with the various sensors such as a temperature sensor, an illuminance sensor, and a microphone. These various sensors can sense information of a space surrounded by the first exterior portion 191 and the second exterior portion 192 through openings separately provided on the second exterior portion 192.

The light source unit 150 emits light to a space surrounded by the first exterior portion 191 and the second exterior portion 192. Specifically, a plurality of the light source units 150 is provided at a position corresponding to the force sense detection structure 131, and emits light to the reflection space 121 surrounded by the first mirror 161 and the second mirror 162. The light source unit 150 can emit light to the reflection space 121 and multiply reflection of the emitted light is caused in the reflection space 121 between the first mirror 161 and the second mirror 162.

The imaging unit 140 is provided on a surface of the base portion 110 opposite to the surface on which the light source unit 150 is provided, and images a space surrounded by the first exterior portion 191 and the second exterior portion 192. Therefore, the imaging unit 140 can image the external space of the sensor device 100 from the external light intake port 100H, and can image the light point group of the reflection light emitted from the light source unit 150 and multiple-reflected by the first mirror 161 and the second mirror 162. For example, the image captured by the imaging unit 140 is output to the outside via a connection portion 145 including a flexible printed board and a flexible cable.

The third exterior portion 193 is a part of a casing of the sensor device 100. Specifically, the third exterior portion 193 can hold the base portion 110 and the imaging unit 140 by disposing the base portion 110 and the imaging unit 140 between the second exterior portion 192 and the third exterior portion 193.

In the sensor device 100 having the above-described configuration, when the external force acts on the force acting portion 120, the flexible body 130 of the force sense detection structure 131 is deformed, and the position of the second mirror 162 attached to the flexible body 130 changes. Thus, the position of each light point of the reflection light multiple-reflected by the first mirror 161 and the second mirror 162 is displaced. Therefore, the sensor device 100 can detect the external force acting on the force acting portion 120 by detecting the displacement of the position of each light point of the reflection light by using the imaging unit 140. Furthermore, the sensor device 100 can image the external space seen from the external light intake port 100H by using the imaging unit 140. Therefore, the sensor device 100 can simultaneously perform imaging of the external space and detection of the external force acting on the force acting portion 120.

In the sensor device 100, the reflection space 121 in which light emitted from the light source unit 150 is multiple-reflected and a space in which light from the external space is incident through the external light intake port 100H are separated. Therefore, as illustrated in FIG. 20, the imaging unit 140 captures an image 910 including a force sense detection region 912 in which a light point group LC of the reflection light of the light emitted from the light source unit 150 is seen and an imaging region 911 in which the external space of the sensor device 100 is seen. That is, in the image 910 captured by the imaging unit 140, the force sense detection region 912 for detecting the external force acting on the force acting portion 120 and the imaging region 911 for imaging the external space are disposed separately from each other. Therefore, the sensor device 100 can suppress interference between the reflection light of the light emitted from the light source unit 150 and the light incident from the external space through the external light intake port 100H.

First Modification Example

Figure 21:
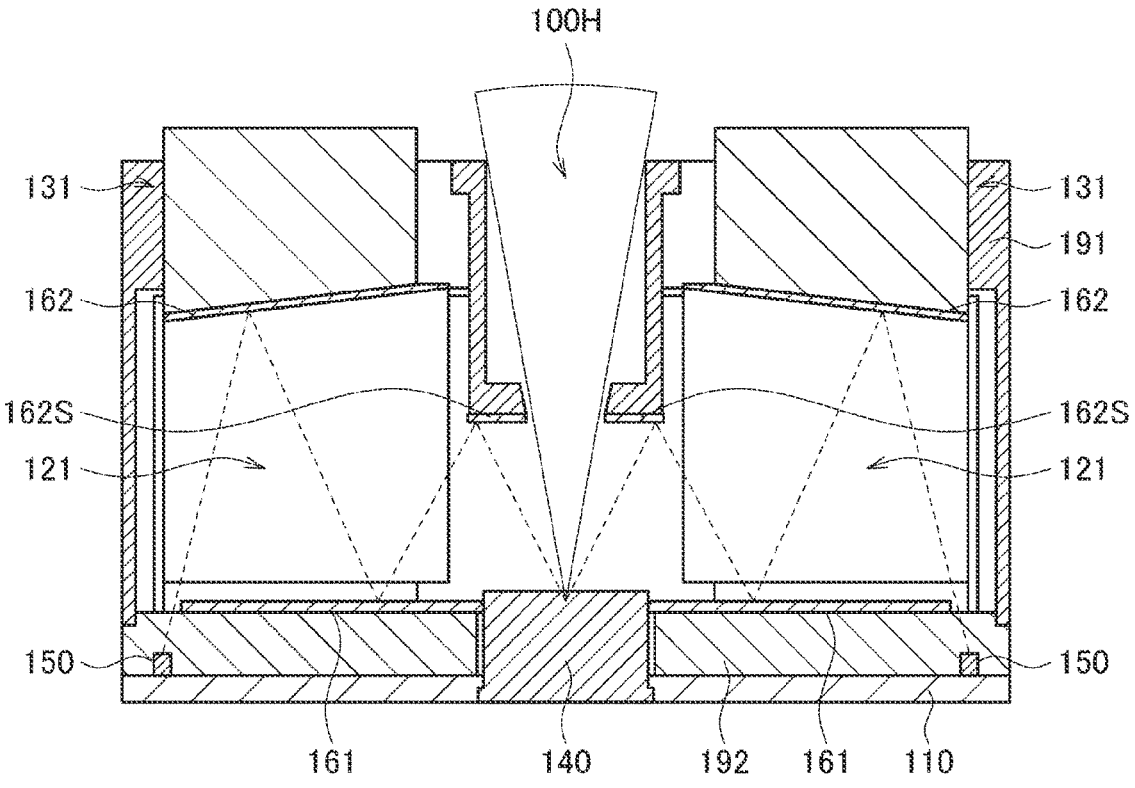
FIG. 21 is a cross-sectional view illustrating a configuration of a sensor device according to a first modification example of the second embodiment.

FIG. 21 is a cross-sectional view illustrating a configuration of the sensor device 100 according to a first modification example. As illustrated in FIG. 21, the sensor device 100 may further include a sub-mirror 162S in addition to the first mirror 161 and the second mirror 162.

For example, the sub-mirrors 162S are provided on both sides of the external light intake port 100H. As an example, the sub-mirrors 162S may be provided on both sides of the external light intake port 100H such that the end surface does not enter a region obtained by imaging the external space.

As another example, the sub-mirrors 162S may have end surfaces cut in parallel with a light beam direction of the light incident on the imaging unit 140 from the external space, and may be provided on both sides of the external light intake port 100H. In this case, each of the sub-mirrors 162S can prevent the image of the external space captured by the imaging unit 140 from being distorted at the end surface of the sub-mirror 162S. Furthermore, the cut end surface of the sub-mirror 162S may be painted black such that the external light incident from the external space is not reflected. As described above, the black color is, for example, an achromatic color having brightness of 30% or less in an HSV color space.

The sub-mirror 162S reflects the light multiple-reflected by the first mirror 161 and the second mirror 162, and thus can guide the multiple-reflected light to the imaging unit 140. At this time, a region in which the imaging unit 140 images the sub-mirror 162S is the force sense detection region 912 in FIG. 20, and a region in which the external space between the sub-mirrors 162S is imaged is the imaging region 911 in FIG. 20.

Therefore, the sensor device 100 according to the first modification example can more clearly separate the force sense detection region 912 for detecting the external force acting on the force acting portion 120 and the imaging region 911 for imaging the external space. Therefore, the sensor device 100 according to the first modification example can suppress interference between the reflection light of the light emitted from the light source unit 150 and the light incident from the external space through the external light intake port 100H.

Second Modification Example

Figure 22:
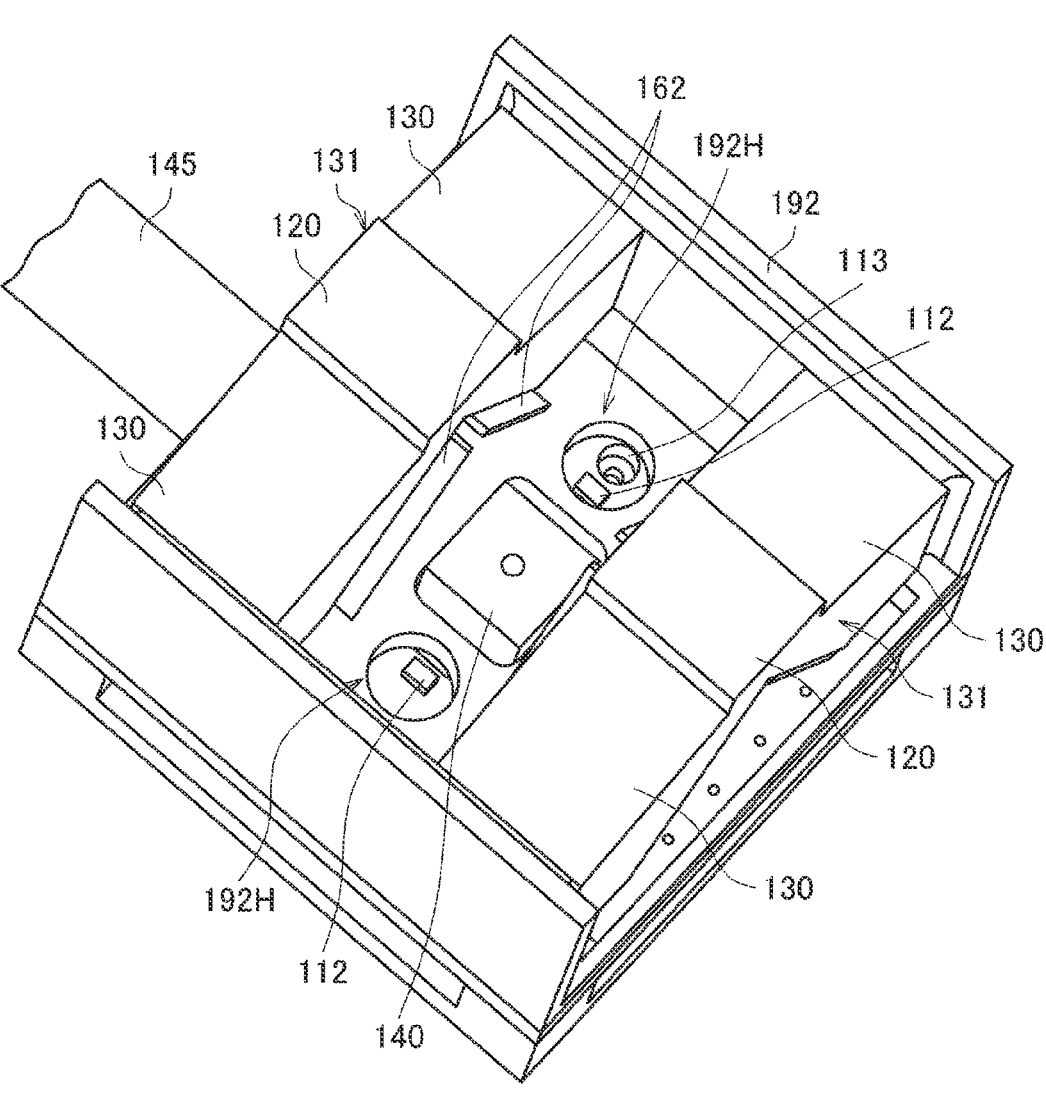
FIG. 22 is a perspective view illustrating a configuration of a sensor device according to a second modification example of the second embodiment, excluding a first exterior portion.

FIG. 22 is a perspective view illustrating a configuration of the sensor device 100 according to a second modification example, excluding the first exterior portion 191. As illustrated in FIG. 22, the sensor device 100 may further include various sensors such as a microphone 113 and a proximity imaging light source 112.

The proximity imaging light source 112 is a light source that illuminates the space surrounded by the first exterior portion 191 and the second exterior portion 192. The proximity imaging light sources 112 may be provided on the base portion 110 by disposing the imaging unit 140 therebetween and illuminate the space surrounded by the first exterior portion 191 and the second exterior portion 192 through openings 192H on the lower surface of the second exterior portion 192.

With this configuration, for example, in a case where the external light is less likely to enter the space surrounded by the first exterior portion 191 and the second exterior portion 192 since the object is close to the sensor device 100, the proximity imaging light source 112 can illuminate the space surrounded by the first exterior portion 191 and the second exterior portion 192. Therefore, even in a case where the external light is less likely to enter the space surrounded by the first exterior portion 191 and the second exterior portion 192, the sensor device 100 can acquire a clear captured image of the object by using the imaging unit 140.

Furthermore, the proximity imaging light source 112 may emit light of a wavelength band different from the wavelength band of the light emitted by the light source unit 150. In other words, the proximity imaging light source 112 and the light source unit 150 may emit light of different colors. For example, in a case where the light source unit 150 emits green laser light or blue laser light, the proximity imaging light source 112 may emit white light. Therefore, the sensor device 100 can prevent the illumination light from the proximity imaging light source 112 from being noise with respect to the reflection light of the light emitted from the light source unit 150.

The microphone 113 detects sound in a space surrounded by the first exterior portion 191 and the second exterior portion 192. The microphone 113 may be provided on the base portion 110 and detect the sound in the space surrounded by the first exterior portion 191 and the second exterior portion 192 through the opening 192H on the lower surface of the second exterior portion 192. Therefore, the sensor device 100 can detect or predict a failure or the like of the sensor device 100 by detecting an abnormal sound from the imaging unit 140, the light source unit 150, the force sense detection structure 131, or the like with the microphone 113.

3. Third Embodiment (Gripping Device)

3.1. Configuration

Next, a configuration of a gripping device according to a third embodiment of the present disclosure is described with reference to FIGS. 23 to 28.

The gripping device according to the third embodiment is a so-called gripper provided with a claw capable of swinging or moving in parallel on the force acting portion 120 of the sensor device 10 according to the first embodiment. By using the sensor device 10 according to the first embodiment, the gripping device according to the third embodiment can simultaneously perform imaging of an object to be gripped and force sense detection when the object is gripped.

First Configuration Example

Figure 23:
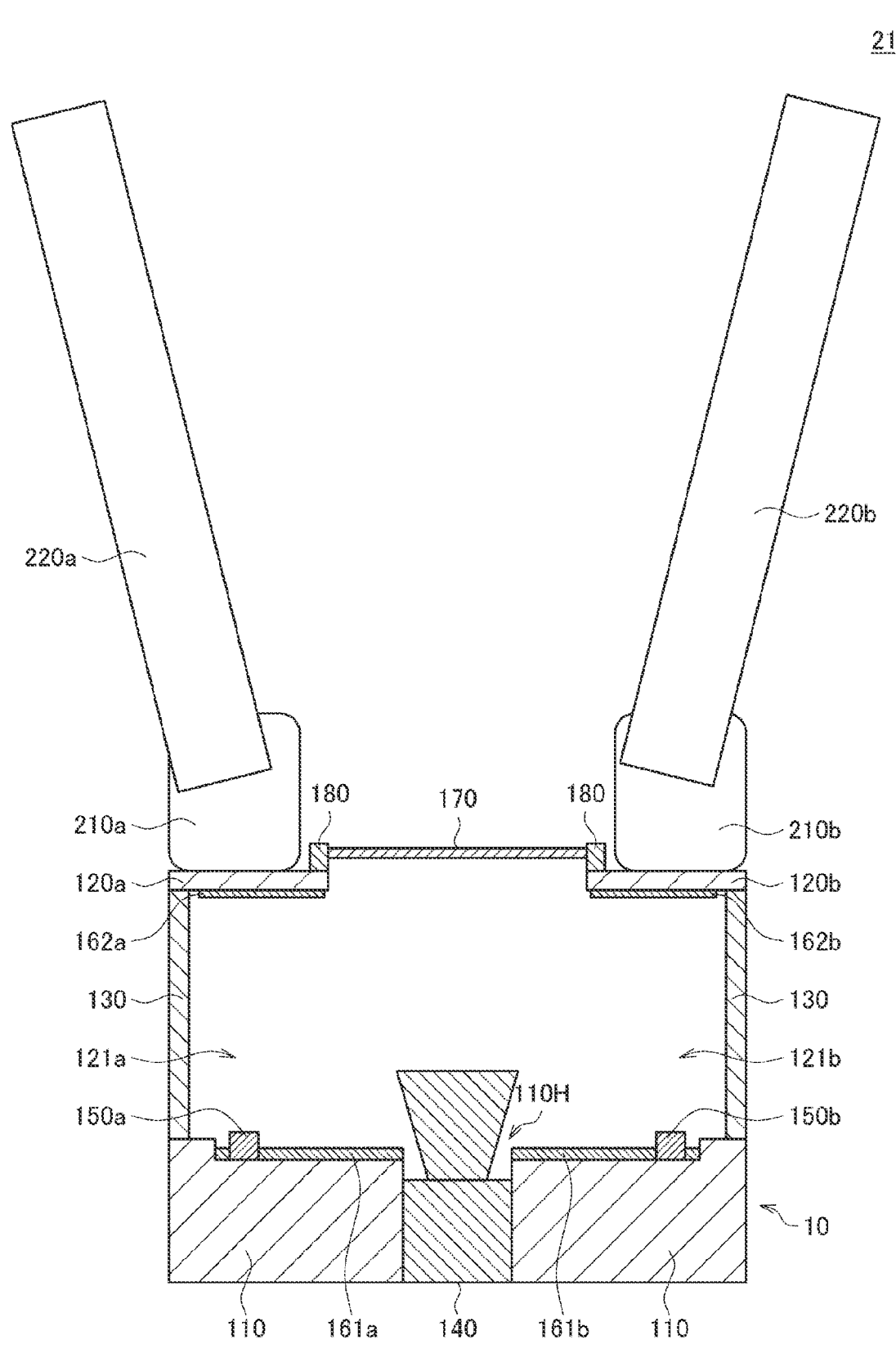
FIG. 23 is a cross-sectional view schematically illustrating a first configuration example of a gripping device according to a third embodiment of the present disclosure.
Figure 24:
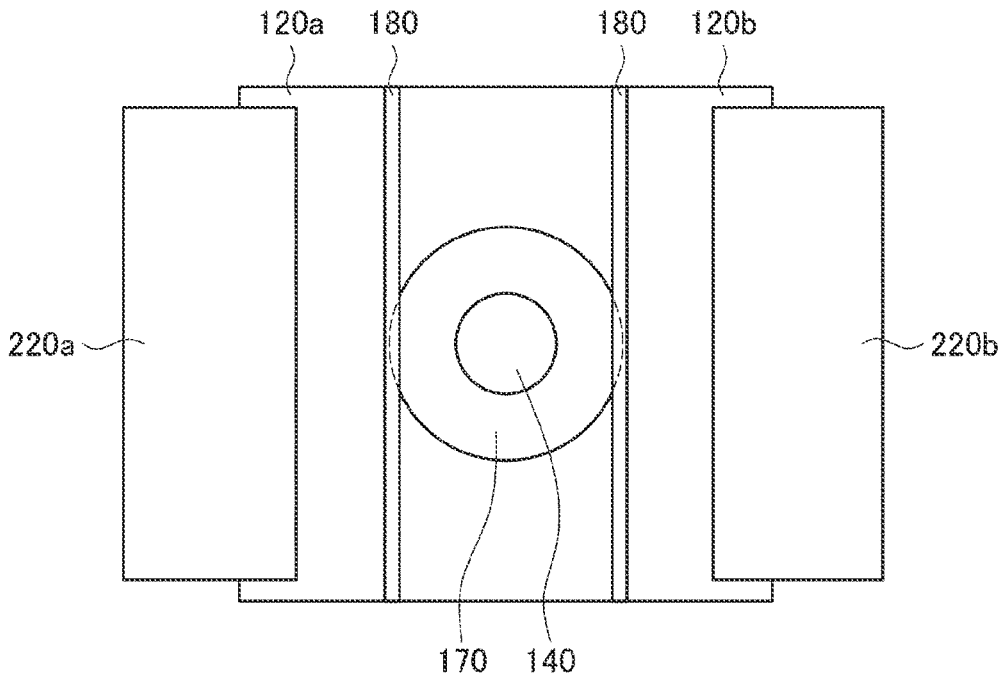
FIG. 24 is a top view schematically illustrating a configuration of the gripping device illustrated in FIG. 23.
Figure 25:
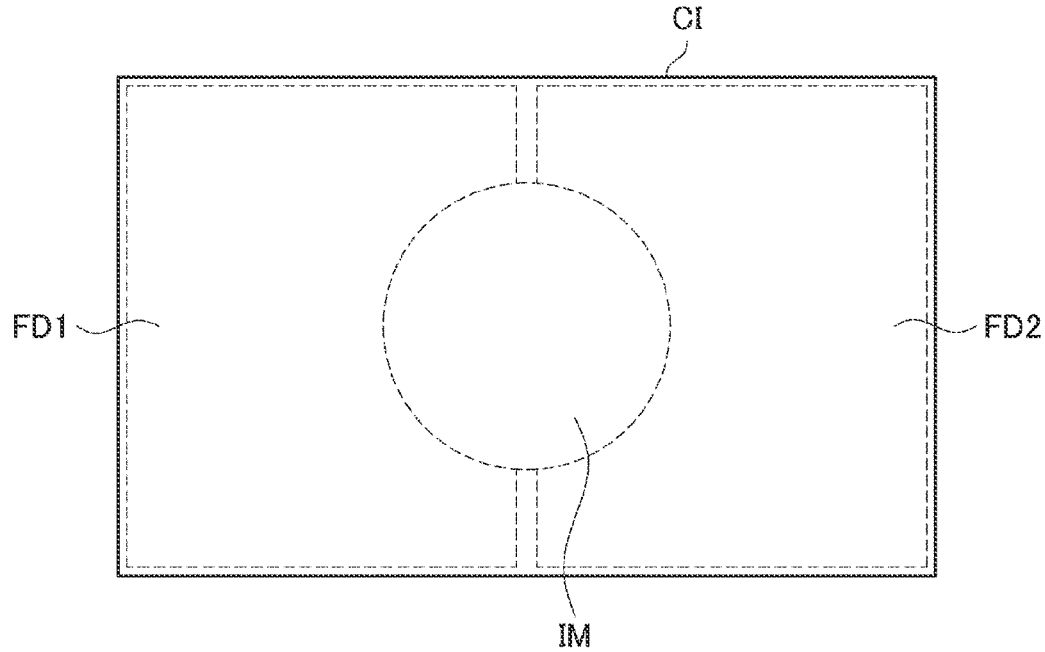
FIG. 25 is an explanatory diagram illustrating a configuration of an image captured by an imaging unit of the gripping device illustrated in FIG. 23.

FIG. 23 is a cross-sectional view schematically illustrating a first configuration example of a gripping device 21. FIG. 24 is a top view schematically illustrating a configuration of the gripping device 21 illustrated in FIG. 23. FIG. 25 is an explanatory diagram illustrating a configuration of an image captured by the imaging unit 140 of the gripping device 21 illustrated in FIG. 23.

As illustrated in FIG. 23 and FIG. 24, in the gripping device 21, a drive unit 210a and a claw portion 220a are provided on a first force acting portion 120a of the sensor device 10, and a drive unit 210b and a claw portion 220b are provided on a second force acting portion 120b. The gripping device 21 functions as a gripper that grips the object with two claw portions 220a and 220b.

The two force acting portions 120a and 120b are provided in a 180 degree arrangement around the light intake hole 110H. The drive units 210a and 210b include, for example, motors. The drive unit 210a is provided on the force acting portion 120a, and the drive unit 210b is provided on the force acting portion 120a. The two drive units 210a and 210b can swing the claw portions 220a and 220b right and left independently of each other or in conjunction with each other.

The claw portions 220a and 220b are rigid longitudinal structural members, and hold an object by being swung by the drive units 210a and 210b. Since the object is gripped by the claw portions 220a and 220b, the external force acts on the force acting portions 120a and 120b of the sensor device 10. For example, the external force acting on the force acting portion 120a is detected by the sensor device 10 as the displacement of the position of each light point of the reflection light emitted from the light source unit 150a to a reflection space 121a and multiple-reflected by the first mirror 161a and the second mirror 162a. Furthermore, the external force acting on the force acting portion 120b is detected by the sensor device 10 as the displacement of the position of each light point of the reflection light emitted from the light source unit 150b to a reflection space 121b and multiple-reflected by the first mirror 161b and the second mirror 162b. Therefore, the gripping device 21 can detect the force sense to each of the claw portions 220a and 220b independently and in multiple axes. Furthermore, the gripping device 21 can image the object held by the claw portions 220a and 220b with the imaging unit 140 via the half mirror 170 and the light intake hole 110H.

For example, as illustrated in FIG. 25, the imaging unit 140 of the gripping device 21 acquires an image CI including an imaging region IM, a first force sense detection region FD1, and a second force sense detection region FD2. The first force sense detection region FD1 and the second force sense detection region FD2 are provided to be separated from each other around the imaging region IM substantially at the center of the image CI in correspondence with the positions at which the force acting portions 120a and 120b are provided.

The first force sense detection region FD1 is, for example, a region in which the light point group of the reflection light of which the position is displaced on the basis of the external force acting on the force acting portion 120a is imaged. The second force sense detection region FD2 is a region in which the light point group of the reflection light of which the position is displaced on the basis of the external force acting on the force acting portion 120b is imaged. The imaging region IM is a region in which only an image of the object transmitted through the half mirror 170 is captured.

Therefore, the imaging unit 140 of the gripping device 21 can acquire the image CI obtained by structurally separating the first force sense detection region FD1 in which the light point group for detecting the external force acting on the force acting portion 120a is imaged and the second force sense detection region FD2 in which the light point group for detecting the external force acting on the force acting portion 120b is imaged. Furthermore, the imaging unit 140 of the gripping device 21 does not image a light point group for detecting the external force acting on each of the force acting portions 120a and 120b, and can acquire the image CI including the imaging region IM in which only the image of the object is captured.

Therefore, the gripping device 21 according to the first configuration example can grip the object while imaging the object and can detect the force sense when gripping the object, and thus can grip the object with higher accuracy.

Second Configuration Example

Figure 26:
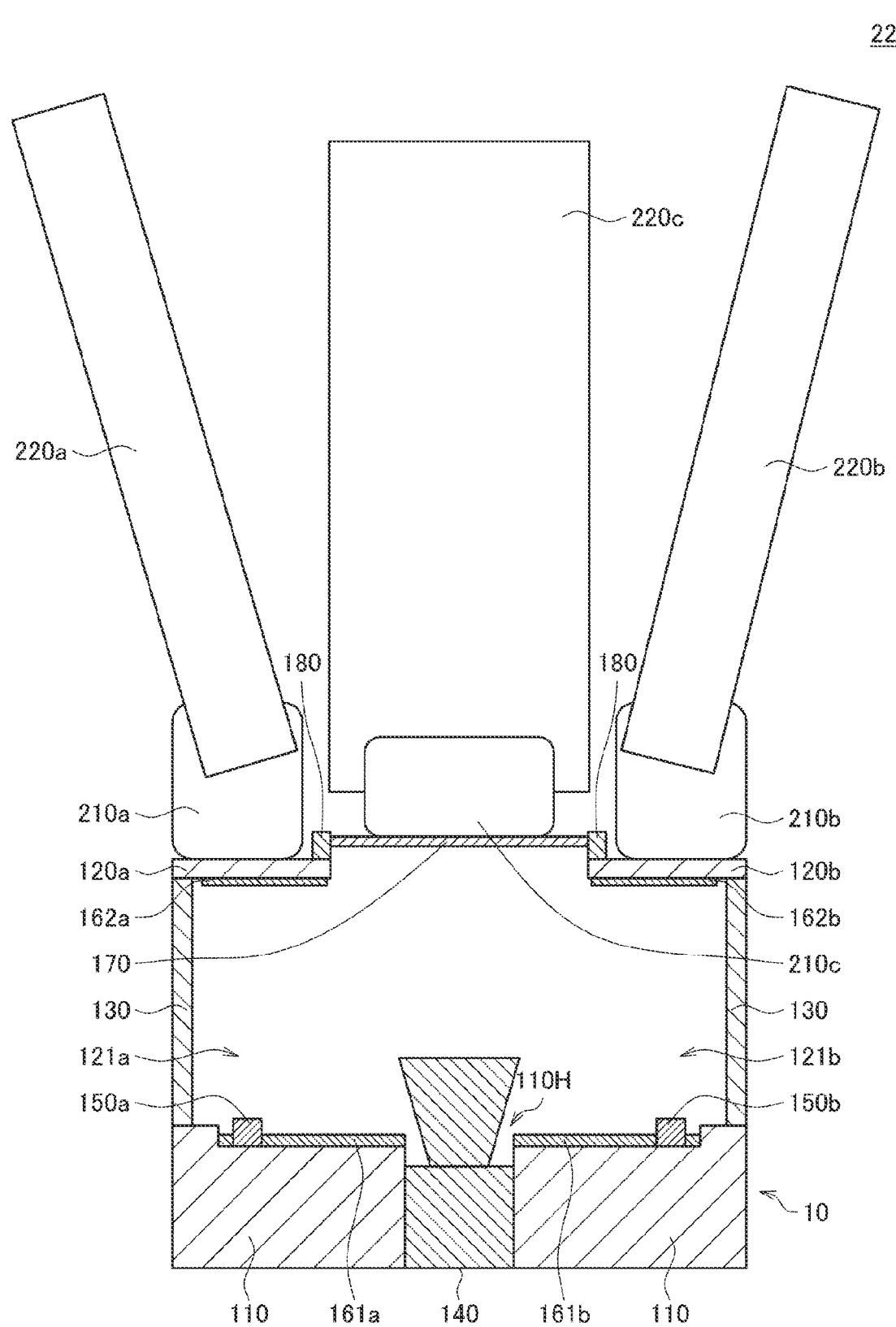
FIG. 26 is a cross-sectional view schematically illustrating a second configuration example of a gripping device according to the third embodiment of the present disclosure.
Figure 27:
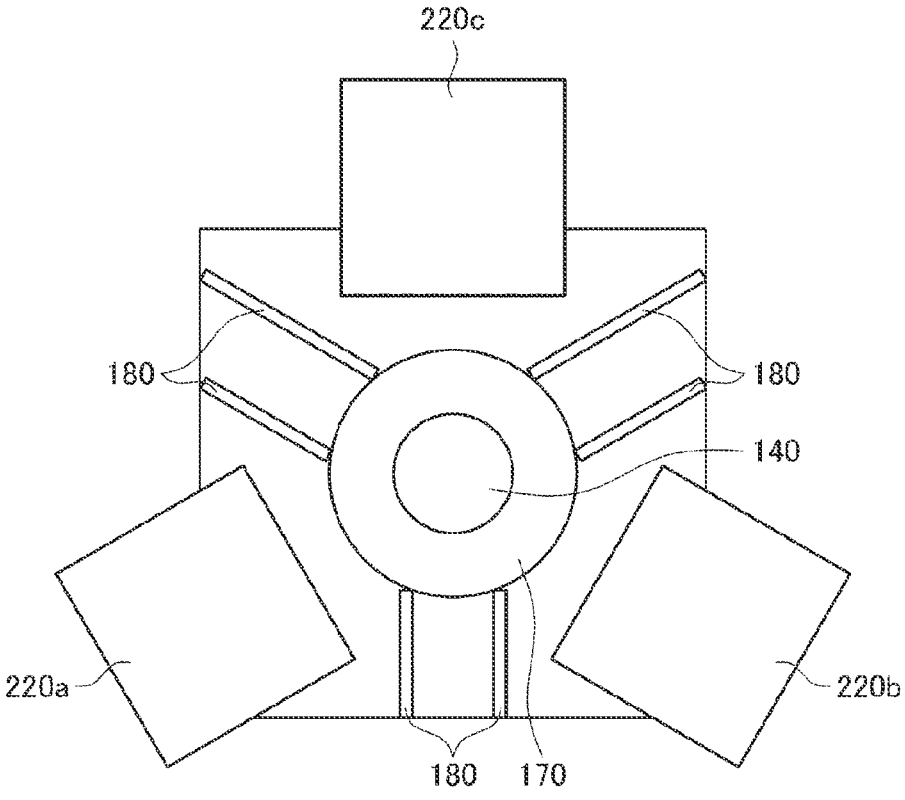
FIG. 27 is a top view schematically illustrating a configuration of the gripping device illustrated in FIG. 26.
Figure 28:
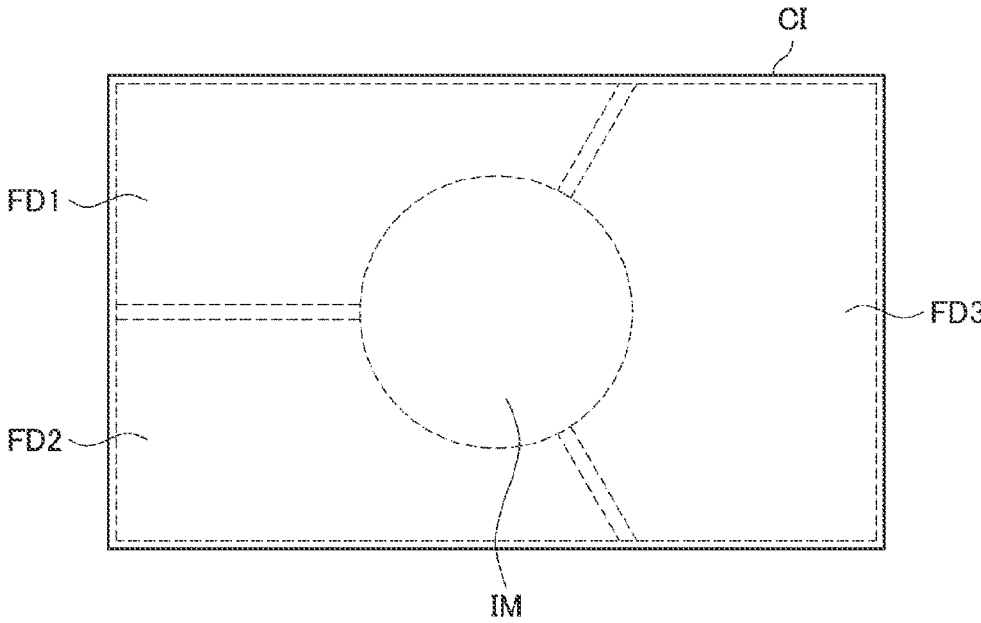
FIG. 28 is an explanatory diagram illustrating a configuration of an image captured by an imaging unit of the gripping device illustrated in FIG. 26.

FIG. 26 is a cross-sectional view schematically illustrating a second configuration example of a gripping device 22. FIG. 27 is a top view schematically illustrating a configuration of the gripping device 22 illustrated in FIG. 26. FIG. 28 is an explanatory diagram illustrating a configuration of an image captured by the imaging unit 140 of the gripping device 22 illustrated in FIG. 26.

As illustrated in FIG. 26 and FIG. 27, in the gripping device 22, the drive unit 210a and the claw portion 220a are provided on the first force acting portion 120a of the sensor device 10, the drive unit 210b and the claw portion 220b are provided on the second force acting portion 120b, and a drive unit 210c and a claw portion 220c are provided on a third force acting portion 120c (not illustrated). The gripping device 22 functions as a gripper that grips the object with three claw portions 220a, 220b, and 220c.

Three force acting portions 120a, 120b, and 120c are provided in a 120-degree-arrangement around the light intake hole 110H. The drive units 210a, 210b, and 210c include, for example, motors. The drive unit 210a is provided on the force acting portion 120a, the drive unit 210b is provided on the force acting portion 120b, and the drive unit 210c is provided on the force acting portion 120c. Three drive units 210a, 210b, and 210c can swing the claw portions 220a, 220b, and 220c back and forth independently of each other or in conjunction with each other.

The claw portions 220a, 220b, and 220c are rigid longitudinal structural members, and hold an object by being swung by the drive units 210a, 210b, and 210c. Since the object is gripped by the claw portions 220a, 220b, and 220c, the external force acts on the force acting portions 120a, 120b, and 120c of the sensor device 10. For example, the external force acting on the force acting portion 120a is detected by the sensor device 10 as the displacement of the position of each light point of the reflection light emitted from the light source unit 150a to a reflection space 121a and multiple-reflected by the first mirror 161a and the second mirror 162a. Furthermore, the external force acting on the force acting portion 120b is detected by the sensor device 10 as the displacement of the position of each light point of the reflection light emitted from the light source unit 150b to a reflection space 121b and multiple-reflected by the first mirror 161b and the second mirror 162b. Moreover, the external force acting on the force acting portion 120c is detected by the sensor device 10 as the displacement of the position of each light point of the reflection light emitted from the light source unit to the reflection space (not illustrated) and multiple-reflected by the first mirror and the second mirror. Therefore, the gripping device 22 can detect the force sense to each of the claw portions 220a, 220b, and 220c independently and in multiple axes. Furthermore, the gripping device 22 can image the object held by the claw portions 220a, 220b, and 220c with the imaging unit 140 via the half mirror 170 and the intake hole 110H.

For example, as illustrated in FIG. 28, the imaging unit 140 of the gripping device 22 acquires an image CI including an imaging region IM, a first force sense detection region FD1, a second force sense detection region FD2, and a third force sense detection region FD3. The first force sense detection region FD1, the second force sense detection region FD2, and the third force sense detection region FD3 are provided to be separated from each other around the imaging region IM substantially at the center of the image CI in correspondence with the positions at which the force acting portions 120a, 120b, and 120c are provided.

The first force sense detection region FD1 is, for example, a region in which the light point group of the reflection light of which the position is displaced on the basis of the external force acting on the force acting portion 120a is imaged. The second force sense detection region FD2 is a region in which the light point group of the reflection light of which the position is displaced on the basis of the external force acting on the force acting portion 120b is imaged. The third force sense detection region FD3 is a region in which the light point group of the reflection light of which the position is displaced on the basis of the external force acting on the force acting portion 120c is imaged. The imaging region IM is a region in which only an image of the object transmitted through the half mirror 170 is captured.

Therefore, the imaging unit 140 of the gripping device 22 can acquire the image CI obtained by structurally separating the first force sense detection region FD1 in which the light point group for detecting the external force acting on the force acting portion 120a is imaged, the second force sense detection region FD2 in which the light point group for detecting the external force acting on the force acting portion 120b is imaged, and the third force sense detection region FD3 in which the light point group for detecting the external force acting on the force acting portion 120c is imaged. Furthermore, the imaging unit 140 of the gripping device 22 does not superimpose the light point group for detecting the external force acting on each of the force acting portions 120a, 120b, and 120c, and can acquire the image CI including the imaging region IM in which only the image of the object is captured.

Therefore, the gripping device 22 according to the second configuration example can grip the object while imaging the object and can detect the force sense when gripping the object, and thus can grip the object with higher accuracy.

Supplementary Note

Note that the gripping device according to the third embodiment may have four or more claw portions. For example, the gripping device may include the sensor device 10 including four force acting portions 120 provided at positions corresponding to vertices of a quadrangle, and a drive unit and a claw portion, which are provided on each of the force acting portions 120.

Figure 29:
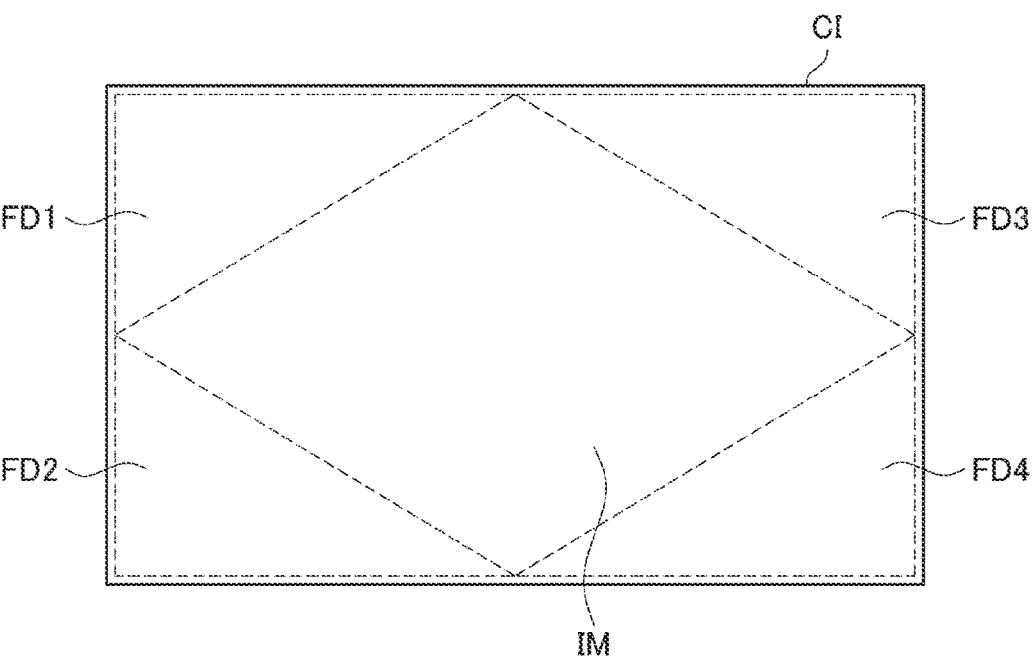
FIG. 29 is a schematic diagram illustrating an example of an image captured by an imaging unit of a gripping device having four claw portions.
Figure 30:
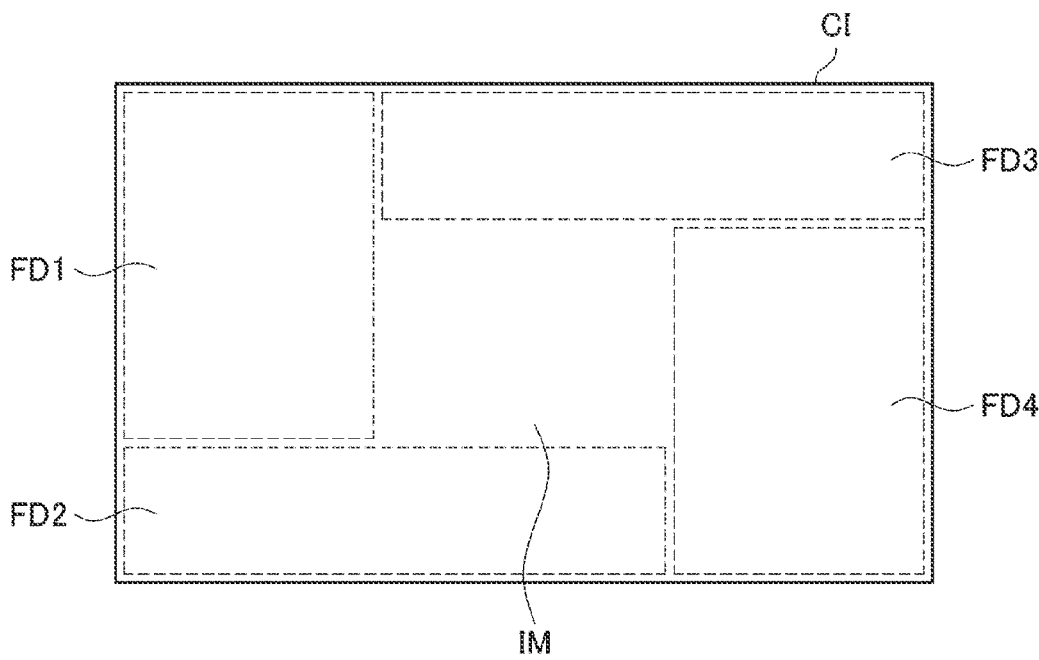
FIG. 30 is a schematic diagram illustrating an example of an image captured by an imaging unit of a gripping device having four claw portions.

In the imaging unit 140 of such a gripping device, for example, image CIs illustrated in FIG. 29 and FIG. 30 can be captured. FIG. 29 and FIG. 30 are schematic diagrams illustrating an example of an image captured by the imaging unit 140 of the gripping device having four claw portions.

For example, as illustrated in FIG. 29 and FIG. 30, the imaging unit 140 of the gripping device having four claw portions acquires each of the image CIs including an imaging region IM, a first force sense detection region FD1, a second force sense detection region FD2, a third force sense detection region FD3, and a fourth force sense detection region FD4.

The imaging region IM is a region in which the external space is seen, and the imaging region IM being disposed at the central portion of the angle of view. The first force sense detection region FD1, the second force sense detection region FD2, the third force sense detection region FD3, and the fourth force sense detection region FD4 are regions in which the light point group of the reflection light of which the position is displaced on the basis of the external force acting on each of the four force acting portions 120 is seen. The first force sense detection region FD1, the second force sense detection region FD2, the third force sense detection region FD3, and the fourth force sense detection region FD4 are disposed at positions corresponding to vertices of the quadrangular image CI in correspondence with the position at which each of four force acting portions 120 is provided.

As illustrated in FIG. 29, for example, the first force sense detection region ED1, the second force sense detection region FD2, the third force sense detection region FD3, and the fourth force sense detection region FD4 may be provided at positions corresponding to vertices of the quadrangular image CI as triangular regions. Furthermore, as illustrated in FIG. 30, the first force sense detection region FD1, the second force sense detection region FD2, the third force sense detection region FD3, and the fourth force sense detection region ED4 may be provided at positions corresponding to vertices of the quadrangular image CI as quadrangular regions.

The imaging unit 140 of the gripping device having four claw portions can capture an image CI obtained by structurally separating the first force sense detection region FD1, the second force sense detection region FD2, the third force sense detection region FD3, the fourth force sense detection region ED4, and the imaging region IM from each other. Thus, the imaging unit 140 can acquire the information regarding the external force acting on each of the four force acting portions 120 and the image of the external space with high accuracy without interfering with each other. Therefore, since the gripping device having four claw portions can grip the object while performing the imaging and detection of the force sense with lower noise, it is possible to grip the object with higher accuracy.

3.2. Function

Figure 31:
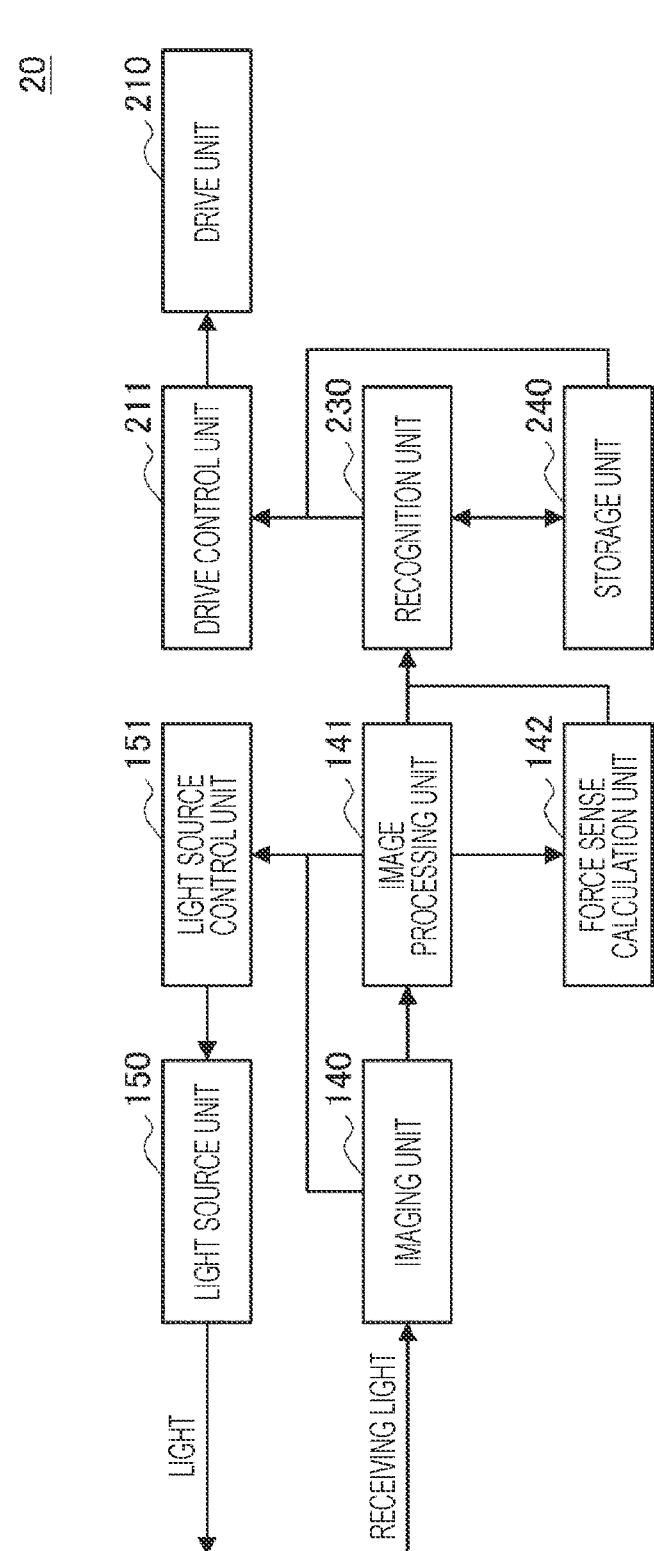
FIG. 31 is a block diagram illustrating a functional configuration of a gripping device according to the third embodiment.

Next, a functional configuration of the gripping device according to the present embodiment will be described with reference to FIG. 31. FIG. 31 is a block diagram illustrating the functional configuration of the gripping device according to the present embodiment. Note that, hereinafter, the gripping device 21 according to the first configuration example and the gripping device 22 according to the second configuration example will be referred to as a gripping device 20 without being distinguished from each other.

As illustrated in FIG. 31, the gripping device 20 includes an imaging unit 140, an image processing unit 141, a force sense calculation unit 142, a light source control unit 151, a light source unit 150, a recognition unit 230, a storage unit 240, a drive control unit 211, and a drive unit 210.

As described above, the imaging unit 140 acquires a captured image by receiving the external light transmitted through the half mirror 170 and the light point group of the reflection light multiple-reflected by the first mirror 161 and the second mirror 162.

The image processing unit 141 performs image processing on the captured image acquired by the imaging unit 140. For example, the image processing unit 141 may generate an image including an object generated from the external light transmitted through the half mirror 170 by performing image processing on the captured image acquired by the imaging unit 140. Furthermore, in a case where a temperature sensor is further provided, the image processing unit 141 may perform temperature compensation on the captured image acquired by the imaging unit 140 on the basis of a sensing result of the temperature sensor. In a case where an IMU is further provided, the image processing unit 141 may perform self-weight compensation on the captured image acquired by the imaging unit 140 on the basis of a sensing result of the IMU.

The force sense calculation unit 142 calculates the magnitude and direction of the external force acting on the force acting portion 120 on the basis of the displacement of the position of each light point of the reflection light multiple-reflected by the first mirror 161 and the second mirror 162. Specifically, the force sense calculation unit 142 may calculate the magnitude and direction of the external force acting on the force acting portion 120 on the basis of a correspondence relationship between the displacement of the position of each light point of the reflection light and the magnitude and direction of the external force acting on the force acting portion 120. The correspondence relationship between the displacement of the position of each light point of the reflection light and the magnitude and direction of the external force acting on the force acting portion 120 can be established in advance by using, for example, a mathematical model or by machine learning.

As described above, the light source unit 150 emits light to the reflection space 121 surrounded by the first mirror 161 and the second mirror 162, and the light source control unit 151 controls the luminance and light emission timing of the light emitted from the light source unit 150. For example, the light source control unit 151 may control the light emission timing of the light emitted from the light source unit 150 according to the frame rate of imaging by the imaging unit 140. Furthermore, the light source control unit 151 may control the luminance of the light emitted from the light source unit 150 on the basis of the brightness of the external space sensed by the illuminance sensor.

The recognition unit 230 recognizes the external space of the gripping device 20 by recognizing the image captured by the imaging unit 140. The recognition unit 230 may recognize the external space of the gripping device 20 by recognizing the image captured by the imaging unit 140 by machine learning.

The storage unit 240 stores various types of information used for control by the drive control unit 211. Specifically, the storage unit 240 may store an image captured by the imaging unit 140, information regarding the external space of the gripping device 20, which is recognized by the recognition unit 230, information regarding the external force acting on the force acting portion 120, which is calculated by the force sense calculation unit 142, and the like.

As described above, the drive unit 210 performs gripping and the like of the object by swinging the claw portion 220 of the gripping device 20, and the drive control unit 211 controls the driving of the drive unit 210. Specifically, the drive control unit 211 may control the driving of the drive unit 210 by using the information regarding the external space of the gripping device 20, which is recognized by the recognition unit 230, the information regarding the external force acting on the force acting portion 120, which is calculated by the force sense calculation unit 142, and the like.

The gripping device 20 including the functional configuration described above can simultaneously sense the external space of the gripping device 20 and the external force acting on the force acting portion 120, and grip the object on the basis of the sensing result. Therefore, the gripping device 20 according to the present embodiment can perform imaging of the external space and detection of the force sense with a smaller and simpler mechanism, and thus it is possible to grip the object with higher accuracy.

4. Application Example

Next, application examples of the sensor device 10 according to the first embodiment and the gripping device 20 according to the third embodiment will be described with reference to FIGS. 32 to 39.

First Application Example of Sensor Device 10

Figure 32:
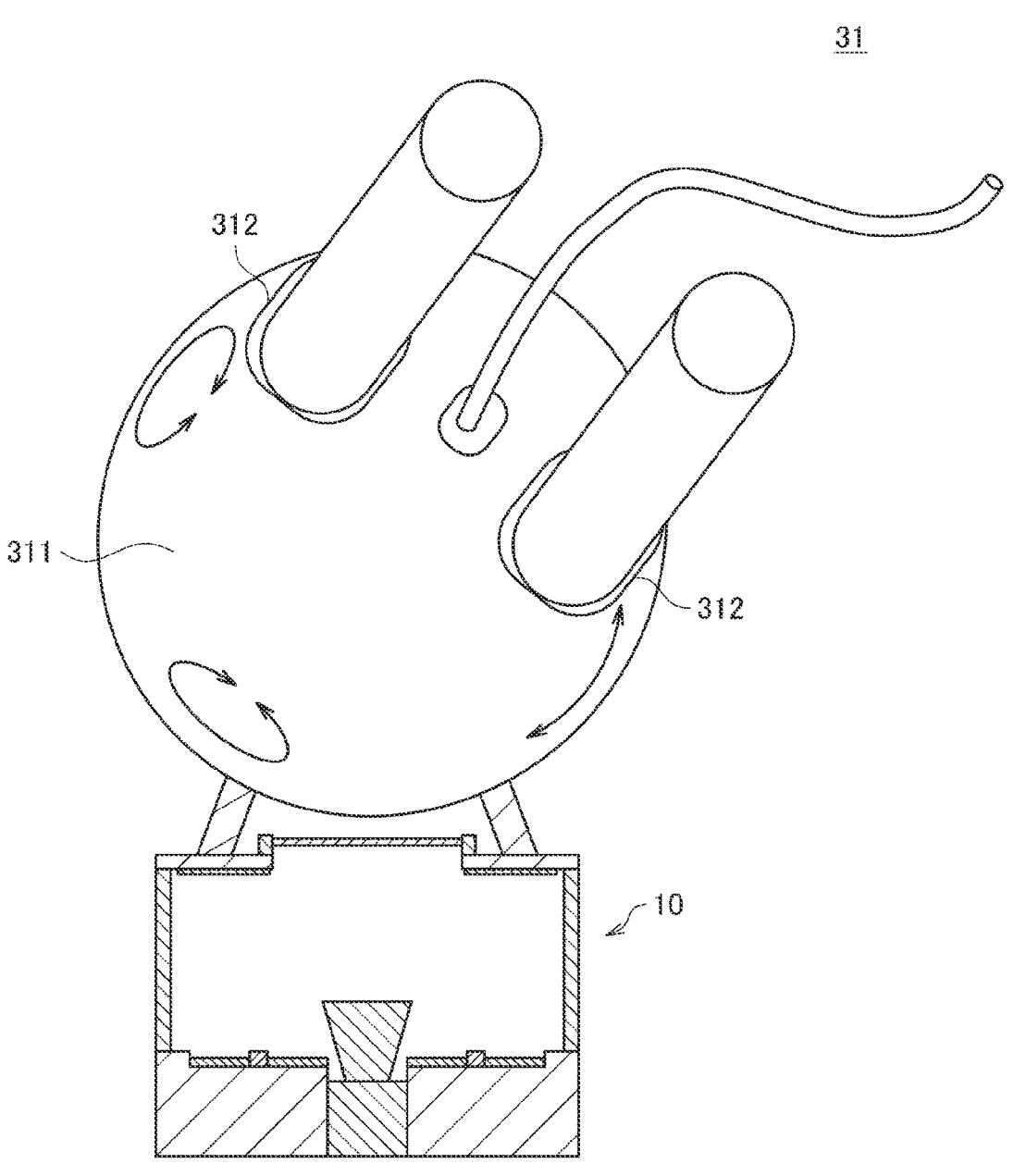
FIG. 32 is an explanatory diagram illustrating an input device as a first application example of a sensor device according to the first or second embodiment.

FIG. 32 is an explanatory diagram illustrating an input device 31 as a first application example of the sensor device 10 according to the first embodiment. As illustrated in FIG. 32, the input device 31 is an input device capable of inputting a rotation angle of three degrees of freedom by operating a spherical structure with fingers. The input device 31 includes an outer shell 311 provided with openings 312 and a sensor device 10.

The outer shell 311 has a hollow spherical structure. At least one of an acceleration sensor, an angular velocity sensor, or a magnetic sensor is mounted in the vicinity of the center of the outer shell 311, and the rotation angle of the spherical structure of the outer shell 311 is detected. A user can input the rotation angle of three degrees of freedom to the input device 31 by putting fingers into the openings 312 and rotating the outer shell 311.

In the sensor device 10, the outer shell 311 is supported by the force acting portion 120, and the surface of the outer shell 311 is imaged by the imaging unit 140. A pattern is provided on the surface of the outer shell 311, and the sensor device 10 can derive the absolute angle of the outer shell 311 on the basis of the pattern provided on the surface of the outer shell 311.

With this configuration, the input device 31 can detect the rotation angle of three degrees of freedom with the sensor mounted on the outer shell 311, and the sensor device 10 can detect the force applied to the outer shell 311 and the absolute angle of the outer shell 311. Therefore, the input device 31 can receive an input of more detailed information from the user.

Second Application Example of Sensor Device 10

Figure 33:
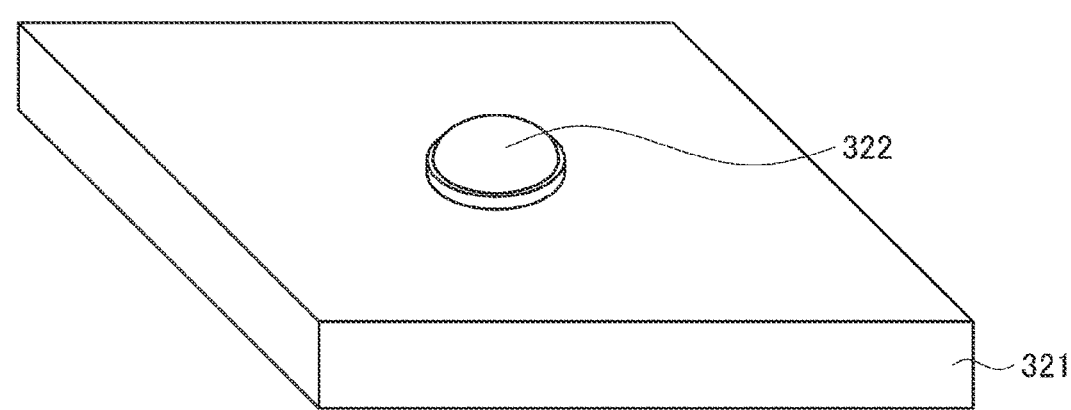
FIG. 33 is a perspective view illustrating a force sense detection device as a second application example of a sensor device according to the first or second embodiment.
Figure 34:
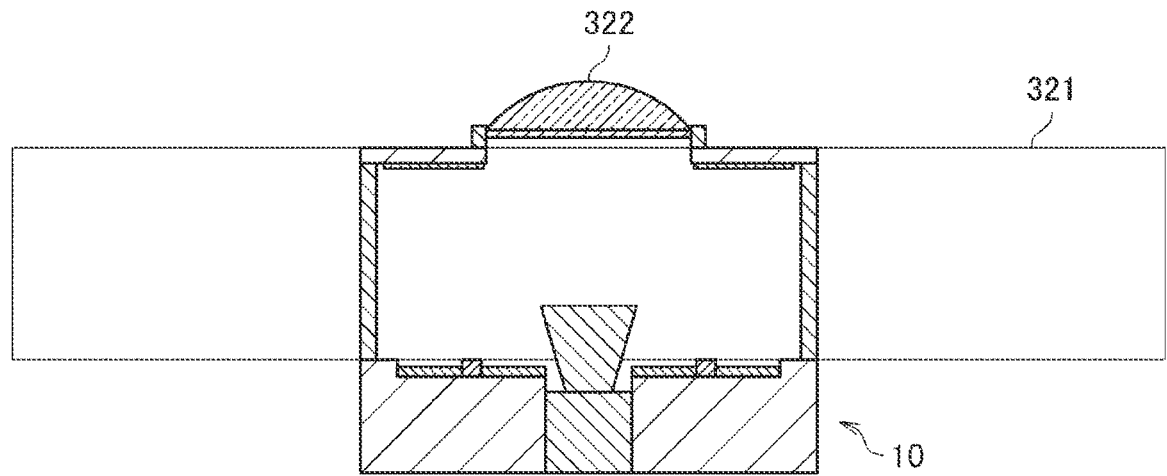
FIG. 34 is a longitudinal cross-sectional view of the force sense detection device illustrated in FIG. 33.

FIG. 33 is a perspective view illustrating a force sense detection device 32 as a second application example of the sensor device 10 according to the first embodiment. FIG. 34 is a longitudinal cross-sectional view of the force sense detection device 32 illustrated in FIG. 33. As illustrated in FIG. 33 and FIG. 34, the force sense detection device 32 includes a touch panel 321, a lens 322, and a sensor device 10.

The sensor device 10 is provided so as to be embedded in the touch panel 321. The touch panel 321 is a flat plate board and is provided to be fixed to the force acting portion 120 of the sensor device 10. Therefore, the sensor device 10 can detect the contact with the touch panel 321 as an external force acting on the force acting portion 120. The lens 322 is provided on the half mirror 170 of the sensor device 10, and condenses external light incident on the sensor device 10 on the imaging unit 140. The lens 322 may be a fisheye lens.

Therefore, the force sense detection device 32 can detect the contact with the touch panel 321 in advance by imaging the external space with the sensor device 10. Furthermore, the force sense detection device 32 can detect the contact with the touch panel 321 with low noise by detecting the force sense with the sensor device 10.

Third Application Example of Sensor Device 10

Figure 35:
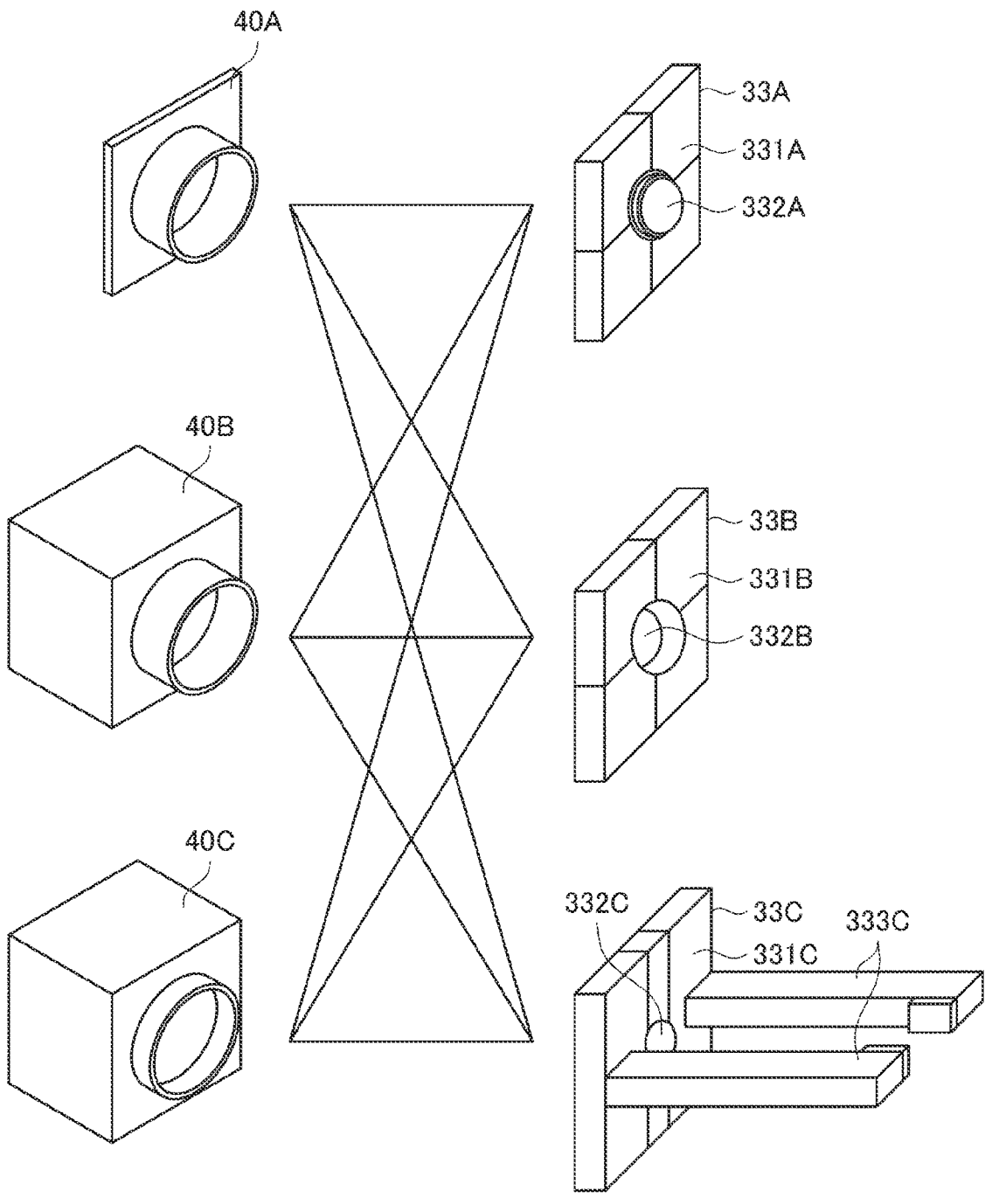
FIG. 35 is a view illustrating a lens device as a third application example of a sensor device according to the first or second embodiment.

FIG. 35 is a view illustrating lens devices 33A, 33B, and 33C as a third application example of the sensor device 10 according to the first embodiment. As illustrated in FIG. 35, the lens devices 33A, 33B, and 33C are lens mount mechanisms capable of constituting the sensor device 10 according to the present embodiment by combining arbitrary image sensors 40A, 40B, and 40C.

For example, the lens device 33A includes a casing portion 331A including the base portion 110 and the force acting portion 120, and a fisheye lens 332A provided to be convex with respect to the casing portion 331A. The lens device 33B includes a casing portion 331B including the base portion 110 and the force acting portion 120, and a normal lens 332B provided to be concave with respect to the casing portion 331B. The lens device 33C includes a casing portion 331C including the base portion 110 and the force acting portion 120, a lens 332C provided in the casing portion 331C, and claw portions 333C constituting a gripper provided on the casing portion 331C.

The lens devices 33A, 33B, and 33C may be provided so as to be attachable to various image sensors by sharing a connection mechanism with the image sensors 40A, 40B, and 40C. Therefore, the lens devices 33A, 33B, and 33C are retrofit to the existing image sensor and thus the imaging of the external space and force sense detection can be performed by using the existing image sensor.

First Application Example of Gripping Device 20

Figure 36:
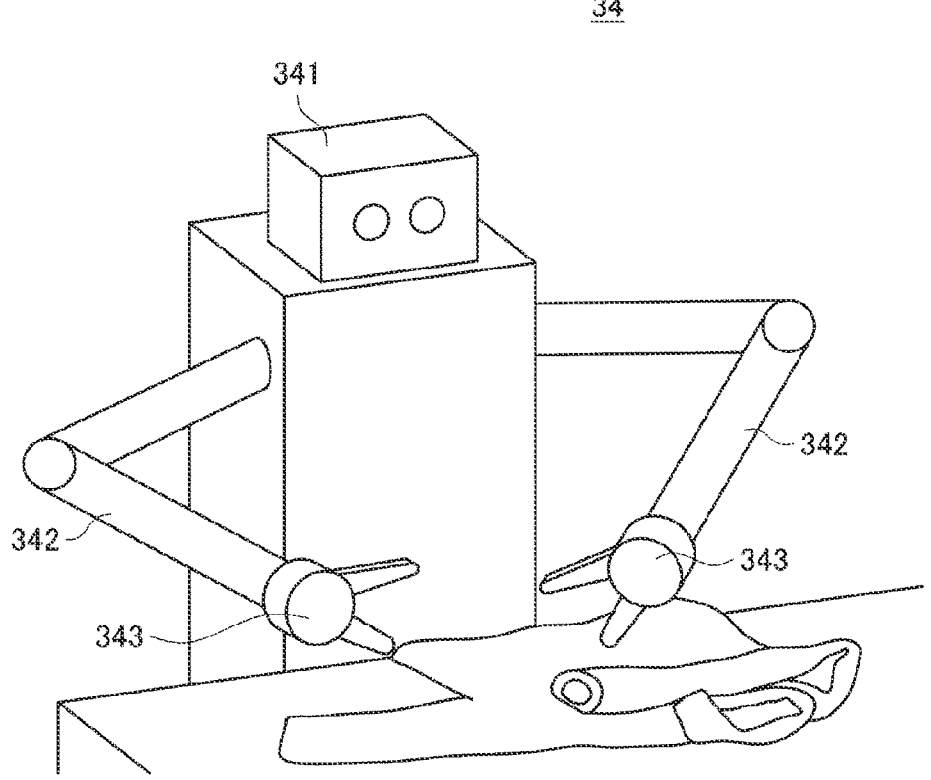
FIG. 36 is an explanatory view illustrating a robot as a first application example of a gripping device according to the third embodiment.

FIG. 36 is an explanatory view illustrating a robot 34 as a first application example of the gripping device 20 according to the third embodiment. As illustrated in FIG. 36, the robot 34 is a humanoid robot. The robot 34 includes a main body portion 341, an arm portion 342, and an effector portion 343.

The main body portion 341 indicates a body and a head of the humanoid robot, and includes, for example, a power supply device, a control device, and an imaging device that images an external space. The arm portion 342 is an arm of the humanoid robot, and includes a link mechanism in which links are connected to each other by a rotatable joint. The effector portion 343 is provided at the distal end of the arm portion 342 and includes the gripping device 20 according to the present embodiment.

By applying the gripping device 20 according to the present embodiment to the effector portion 343, the robot 34 can simultaneously image an object to be gripped with the imaging device provided in the main body portion 341 and the gripping device 20. Therefore, the robot 34 can confirm whether or not the object is operated as intended with higher accuracy by using the gripping device 20. For example, when the object such as a door knob is rotated by the effector portion 343, the robot 34 can confirm whether or not the object follows the rotation of the effector portion 343 by using a captured image. Therefore, the robot 34 can grip the object while confirming with the imaging by the gripping device 20, and thus it is possible to grip various objects in a more stable state.

Second Application Example of Gripping Device 20

Figure 37:
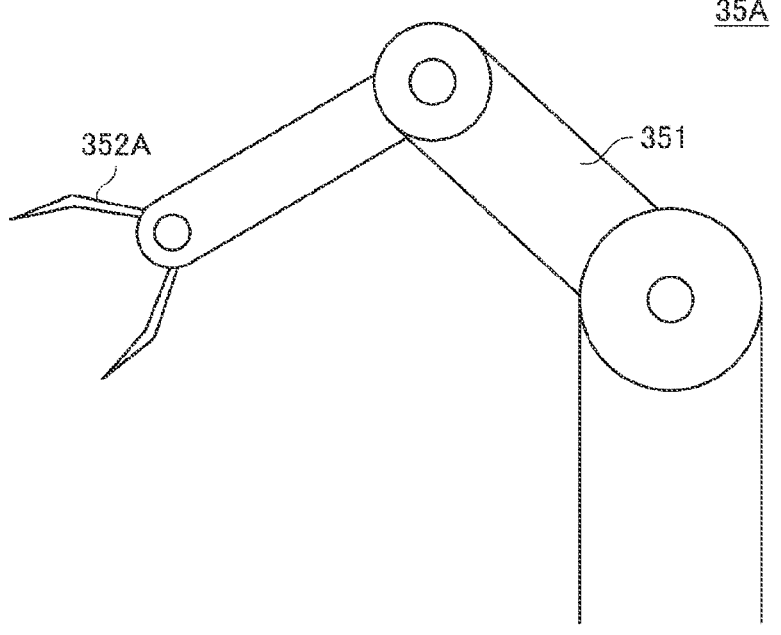
FIG. 37 is an explanatory view illustrating an example of a robot arm device as a second application example of a gripping device according to the third embodiment.
Figure 38:
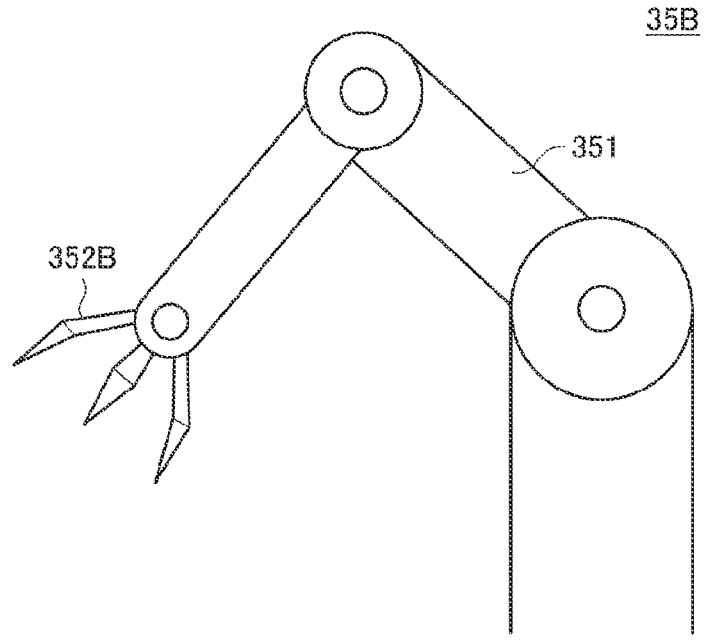
FIG. 38 is an explanatory view illustrating another example of a robot arm device as the second application example of a gripping device according to the third embodiment.

FIG. 37 and FIG. 38 are explanatory views illustrating robot arm devices 35A and 35B as a second application example of the gripping device 20 according to the third embodiment.

As illustrated in FIG. 37, the robot arm device 35A is a single-arm robot arm device including a two-claw gripper. The robot arm device 35A includes an arm portion 351 and an effector portion 352A. As illustrated in FIG. 38, the robot arm device 35B is a single-arm robot arm device including a three-claw gripper. The robot arm device 35B includes an arm portion 351 and an effector portion 352B.

The arm portion 351 includes a link mechanism in which links are connected to each other by a rotatable joint. The effector portion 352A is provided at the distal end of the arm portion 351 and includes the gripping device 21 according to the present embodiment. The effector portion 352B is provided at the distal end of the arm portion 351 and includes the gripping device 22 according to the present embodiment.

By applying the gripping device 20 according to the present embodiment to the effector portions 352A and 352B, the robot arm device 35 can grip the object while imaging the object with the gripping device 20.

Furthermore, the robot arm device 35 can detect a gripping force with respect to the object with the gripping device 20, and thus can grip the object in a more stable state.

Third Application Example of Gripping Device 20

Figure 39:
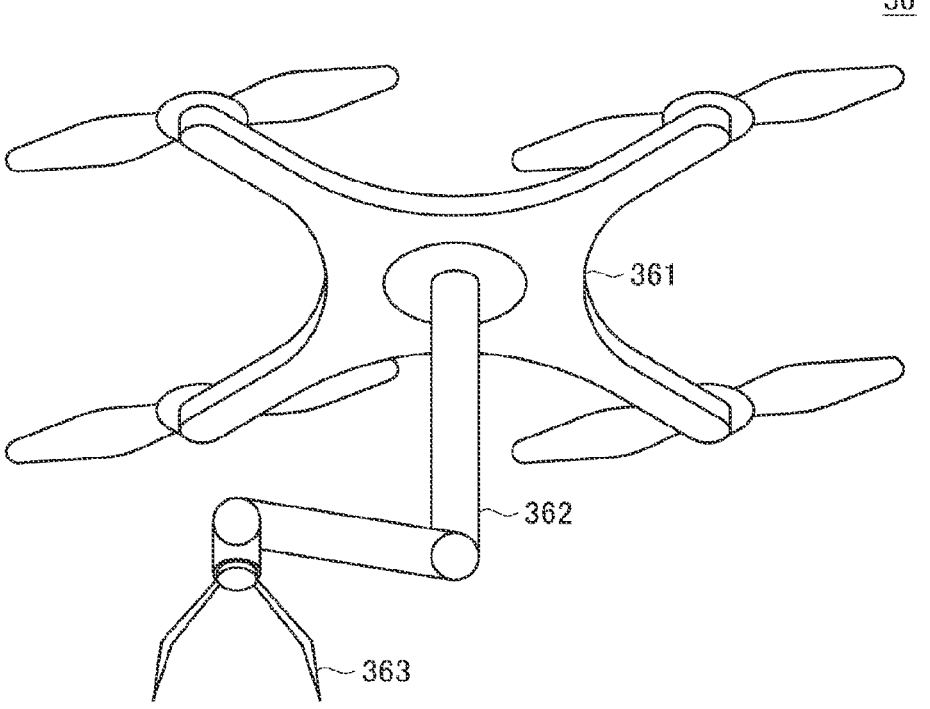
FIG. 39 is an explanatory view illustrating a mobile body as a third application example of a gripping device according to the third embodiment.

FIG. 39 is an explanatory view illustrating a mobile body 36 as a third application example of the gripping device 20 according to the third embodiment. As illustrated in FIG. 39, the mobile body 36 is a drone capable of moving and stopping in the air by remote control. The mobile body 36 includes a main body portion 361, an arm portion 362, and an effector portion 363.

The main body portion 361 is a main part of the mobile body 36, and includes a power supply device, a control device, an imaging device that images an external space, and a flight mechanism. The main body portion 361 may be, for example, a rotorcraft (so-called multicopter) equipped with three or more rotors. The arm portion 362 is provided on the main body portion 361, and includes a link mechanism in which links are connected to each other by a rotatable joint. The effector portion 363 is provided at the distal end of the arm portion 362 and includes the gripping device 20 according to the present embodiment.

By applying the gripping device 20 according to the present embodiment to the effector portion 363, the mobile body 36 can perform imaging and force sense detection of the object with the gripping device 20, and thus can accurately grip the object even in a situation where vibration is large. Furthermore, the mobile body 36 can image the object with the gripping device 20 even in a situation where the imaging device mounted on the main body portion 361 is shielded by the arm portion 362 and it is difficult to image the object, and thus it is possible to accurately recognize the object.

The preferred embodiments of the present disclosure have been described above in detail with reference to the accompanying drawings, but the technical scope of the present disclosure is not limited to such examples. It is obvious that those with ordinary skill in the technical field of the present disclosure may conceive various modifications or corrections within the scope of the technical idea recited in claims, and it is naturally understood that they also fall within the technical scope of the present disclosure.

For example, in the above-described embodiments, the sensor device 10 and the gripping device 20 include the imaging unit 140, but the technology according to the present disclosure is not limited to the above-described examples. The sensor device 10 and the gripping device 20 may receive the light incident through the light intake hole 110H by the retrofitted or separated image sensor. Even in such a case, it is possible to perform imaging of the external space and the force sense detection from an image captured by the image sensor.

Furthermore, the effects described in this specification are merely illustrative or exemplary, and are not limiting. That is, the technology according to the present disclosure may exhibit other effects obvious to those skilled in the art from the description of the present specification together with or in place of the effects described above.

Note that the following configurations also fall within the technical scope of the present disclosure.

(1)

A sensor device including:

a force acting portion exposed from an opening provided on an exterior portion and attached to an inside of the exterior portion via a flexible body;

a reflection space of which at least two surfaces are surrounded by a first mirror provided on an inner bottom surface of the exterior portion and a second mirror provided on a surface of the force acting portion or flexible body, the surface facing the first mirror; and a light source unit configured to emit light to the reflection space; and an imaging unit provided on the inner bottom surface of the exterior portion and configured to capture an image including a force sense detection region in which reflection light of the light emitted from the light source unit is seen.

(2)

The sensor device according to (1), in which at least three surfaces of the reflection space are surrounded by the first mirror and the second mirror.

(3)

The sensor device according to (2), in which the first mirror and the second mirror are provided to face each other so as to form side surfaces of a triangular column, a quadratic column, a triangular pyramid, or a quadrangular pyramid.

(4)

The sensor device according to any one of (1) to (3), in which a light point group of the reflection light reflected in the reflection space is seen in the force sense detection region, and an external force acting on the force acting portion is calculated from displacement of the light point group.

(5)

The sensor device according to (4), in which the external force acting on the force acting portion is calculated from the displacement of the light point group by machine learning.

(6)

The sensor device according to any one of (1) to (5), in which the force acting portion is attached to an inner side surface of the exterior portion via the flexible body.

(7)

The sensor device according to any one of (1) to (6), in which emission of the light from the light source unit is controlled according to an imaging frame rate of the imaging unit.

(8)

The sensor device according to any one of (1) to (7), in which a plurality of the light source units is provided corresponding to the force acting portion.

(9)

The sensor device according to any one of (1) to (8), in which the image captured by the imaging unit further includes an imaging region in which an external space of the exterior portion is seen.

(10)

The sensor device according to (9), in which the force sense detection region is provided at a position corresponding to each of the force acting portions with respect to the imaging region.

(11)

The sensor device according to (9) or (10), in which the first mirror has an end surface cut in parallel with a light beam direction of light incident on the imaging unit from the external space.

(12)

The sensor device according to (11), in which the end surface of the first mirror has a black color.

(13)

The sensor device according to any one of (1) to (12), in which the light source unit emits the light to the reflection space via a pinhole.

(14)

The sensor device according to any one of (1) to (13), in which the light source unit is provided on the inner bottom surface.

(15)

The sensor device according to any one of (1) to (14), in which the imaging unit detects light in a wavelength band of visible light and light in a wavelength band of infrared light.

(16)

The sensor device according to (15), in which the light source unit emits the light in a wavelength band of the infrared light, and the imaging unit captures an image including a force sense detection region in which the reflection light of the light in a wavelength band of the infrared light is seen and an imaging region in which an external space in which the light in a wavelength band of the infrared light is reduced is seen.

(17)

The sensor device according to any one of (1) to (16), in which the imaging unit includes a distance measurement pixel.

(18)

The sensor device according to any one of (1) to (17), in which a gap between an outer edge of the opening provided on the exterior portion and the force acting portion is smaller than an allowable deformation amount of the flexible body.

(19)

The sensor device according to any one of (1) to (18), in which a proximity imaging light source is further provided on the inner bottom surface.

(20)

The sensor device according to (19), in which the proximity imaging light source and the light source unit emit the light of different wavelength bands.

Moreover, the following configurations also fall within the technical scope of the present disclosure.

(1)

An optical device including:

a base portion provided with a light intake hole that takes in external light;

a force acting portion provided on the base portion around the light intake hole via a flexible body;

a reflection space of which at least two surfaces are surrounded by mirrors provided on surfaces of the base portion and force acting portion, the surface facing each other;

a light source unit configured to emit light to the reflection space; and a half mirror provided on an incident surface side of the external light, and configured to partially transmit the external light and partially reflect the light emitted from the light source unit or reflection light of the light.

(2)

The optical device according to (1), in which at least three surfaces of the reflection space are surrounded by the mirrors.

(3)

The optical device according to (2), in which the mirrors are provided to face each other so as to form side surfaces of a triangular column, a quadratic column, a triangular pyramid, or a quadrangular pyramid.

(4)

The optical device according to any one of (1) to (3), in which in an image captured through the light intake hole, a light point group of the light reflected in the reflection space is superimposed on an image of an external space, which is captured using the external light.

(5)

The optical device according to (4), in which an external force acting on the force acting portion is calculated from displacement of the light point group.

(6)

The optical device according to (5), in which the external force acting on the force acting portion is calculated from the displacement of the light point group by machine learning.

(7)

The optical device according to any one of (4) to (6), in which in the image captured through the light intake hole, the light point group is superimposed on the captured image of a region corresponding to the force acting portion.

(8)

The optical device according to any one of (4) to (7), in which emission of the light from the light source unit is controlled according to a frame rate of imaging through the light intake hole.

(9)

The optical device according to any one of (1) to (8), in which two or more of the force acting portions are provided point-symmetrically or line-symmetrically around the light intake hole.

(10)

The optical device according to (9), in which the half mirror is connected to each of the force acting portions via the flexible body so as to cover the light intake hole.

(11)

The optical device according to any one of (1) to (10), in which the half mirror has a rectangular flat plate shape.

(12)

The optical device according to (9) or (10), in which claw portions of a gripper are connected to the force acting portions, respectively.

(13)

The optical device according to any one of (1) to (12), in which the light source unit emits the light to the reflection space via a pinhole.

(14)

The optical device according to (13), in which the pinhole is a conical hole that tapers toward the reflection space.

(15)

The optical device according to any one of (1) to (14), in which the light source unit is provided on the base portion.

(16)

The optical device according to any one of (1) to (15), in which a plurality of the light source units is provided, and a plurality of the light source units emits the light of the same or different colors.

(17)

The optical device according to (16), in which a plurality of the force acting portions is provided, and the light source units are provided corresponding to the force acting portions, respectively.

(18)

The optical device according to any one of (1) to (17), further including an exterior portion provided to have a cylindrical shape or a rectangular cylindrical shape on an outer edge of the base portion and configured to accommodate the force acting portion and the reflection space therein.

(19)

A sensor device including:

a base portion provided with a light intake hole that takes in external light;

a force acting portion provided on the base portion around the light intake hole via a flexible body;

a reflection space of which at least two surfaces are surrounded by mirrors provided on surfaces of the base portion and force acting portion, the surface facing each other;

a light source unit configured to emit light to the reflection space;

a half mirror provided on an incident surface side of the external light, and configured to partially transmit the external light and partially reflect the light emitted from the light source unit or reflection light of the light; and an imaging unit configured to acquire an image obtained by superimposing a light point group of the light reflected in the reflection space and an image captured using the external light.

REFERENCE SIGNS LIST 10, 11, 100 Sensor Device
110 Base portion
110H Light intake hole
111 Protrusion
120 Force acting portion
121 Reflection space
130, 180 Flexible body 131 Force sense detection structure
140 Imaging unit
141 Image processing unit
142 Force sense calculation unit
150 Light source unit
150H Pinhole
151 Light source control unit
161 First mirror
162 Second mirror
170 Half mirror
191 First exterior portion
192 Second exterior portion
192 Third exterior portion
20, 21, 22 Gripping device
210 Drive unit
211 Drive control unit
200 Claw portion
230 Recognition unit
40 Storage unit
CI, CIX Image
LC1, LC2 Light point group

The invention claimed is:

1. A sensor device comprising:

a casing having an exterior portion with a light intake hole provided through an outer upper surface to an inside of the exterior portion;

at least one force acting portion including a protrusion exposed above the outer upper surface from an opening for each force acting portion provided through the outer upper surface to the inside of the exterior portion, each force acting portion being attached to the inside of the exterior portion via a flexible body;

a reflection space provided within the inside of the exterior portion, the reflection space including at least two surfaces with a first mirror provided on an inner bottom surface of the exterior portion and at least one second mirror provided on at least one of a surface of each force acting portion or a surface of each flexible body, the at least one second mirror facing the first mirror;

a light source configured to emit light to the reflection space; and an imaging device provided on the inner bottom surface of the exterior portion, the imaging device being configured to capture an image including an imaging region in which light that passes through the light intake hole is seen and a force sense detection region in which reflection light of the light emitted from the light source to the reflection space is seen.

2. The sensor device according to claim 1, wherein at least three surfaces of the reflection space are provided with the first mirror and a plurality of second mirrors provided on the at least one of the surface of the force acting portion or the surface of the flexible body.

3. The sensor device according to claim 2, wherein the first mirror and the plurality of second mirrors are provided to face each other so as to form side surfaces of a triangular column, a quadratic column, a triangular pyramid, or a quadrangular pyramid.

4. The sensor device according to claim 1, wherein a light point group of the reflection light reflected in the reflection space is seen in the force sense detection region, and an external force acting on each force acting portion is calculated from displacement of the light point group.

5. The sensor device according to claim 4, wherein the external force acting on each force acting portion is calculated from the displacement of the light point group by machine learning.

6. The sensor device according to claim 1, wherein the at least one force acting portion is attached to an inner side surface of the exterior portion via the flexible body.

7. The sensor device according to claim 1, wherein emission of the light from the light source is controlled according to an imaging frame rate of the imaging device.

8. The sensor device according to claim 1, wherein a plurality of light sources are provided corresponding to the at least one force acting portion.

9. The sensor device according to claim 1, wherein the imaging region is a region of the image in which an external space outside the light intake hole of the exterior portion is seen.

10. The sensor device according to claim 9, wherein the force sense detection region is provided at a position corresponding to each force acting portion with respect to the imaging region.

11. The sensor device according to claim 9, wherein the first mirror has an end surface cut in parallel with a light beam direction of light incident on the imaging device from the external space.

12. The sensor device according to claim 11, wherein the end surface of the first mirror is provided with a black color.

13. The sensor device according to claim 1, wherein the light source emits the light to the reflection space via a pinhole.

14. The sensor device according to claim 1, wherein the light source is provided on the inner bottom surface of the exterior portion.

15. The sensor device according to claim 1, wherein the imaging device is further configured to detect light in a wavelength band of visible light and light in a wavelength band of infrared light.

16. The sensor device according to claim 15, wherein the light source emits the light in the wavelength band of the infrared light, and wherein the imaging device captures image including the force sense detection region in which the reflection light of the light in the wavelength band of the infrared light is seen and the imaging region in which an external space in which the light in the wavelength band of the infrared light is reduced is seen.

17. The sensor device according to claim 1, wherein the imaging device includes a distance measurement device that is further configured to output only data of a pixel of which luminance has changed.

18. The sensor device according to claim 1, wherein a gap between an outer edge of each opening provided on the exterior portion and each force acting portion is smaller than an allowable deformation amount of the flexible body.

19. The sensor device according to claim 1, further comprising:

a proximity imaging light source provided on the inner bottom surface of the exterior portion.

20. The sensor device according to claim 19, wherein the proximity imaging light source and the light source emit light of different wavelength bands.

* * * * *